United States Patent
Sharma et al.

(10) Patent No.: US 12,298,916 B2
(45) Date of Patent: May 13, 2025

(54) PAGE REQUEST INTERFACE SUPPORT IN HANDLING HOST SUBMISSION QUEUES AND COMPLETION AUTOMATION ASSOCIATED WITH CACHING HOST MEMORY ADDRESS TRANSLATION DATA

(71) Applicant: Micron Technology, Inc., Boise, ID (US)

(72) Inventors: Prateek Sharma, San Jose, CA (US); Raja V. S. Halaharivi, Gilroy, CA (US); Sumangal Chakrabarty, Campbell, CA (US); Venkat R. Gaddam, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/517,370

(22) Filed: Nov. 22, 2023

(65) Prior Publication Data
US 2024/0168891 A1    May 23, 2024

Related U.S. Application Data

(60) Provisional application No. 63/427,561, filed on Nov. 23, 2022.

(51) Int. Cl.
G06F 12/123 (2016.01)
G06F 12/0882 (2016.01)

(52) U.S. Cl.
CPC ........ G06F 12/123 (2013.01); G06F 12/0882 (2013.01); *G06F 2212/1021* (2013.01)

(58) Field of Classification Search
CPC ............... G06F 12/123; G06F 12/0882; G06F 2212/1021
See application file for complete search history.

(56) References Cited

U.S. PATENT DOCUMENTS

2022/0245072 A1 * 8/2022 Roweth ............. G06F 15/17331

* cited by examiner

*Primary Examiner* — Gurtej Bansal
(74) *Attorney, Agent, or Firm* — Lowenstein Sandler LLP

(57) ABSTRACT

A device includes an address translation circuit of host interface circuitry to handle address translation requests to a host system from a host queue interface circuit. The address translation circuit includes cache to store address translations associated with the address translation requests. The host queue interface circuit, coupled to the address translation circuit, is to: pause command fetch arbitration on a submission queue of the host system that is targeted by an address translation request that missed at the cache; trigger a page request interface (PRI) handler to send a page miss request to a translation agent (TA) of the host, the page miss request including a virtual address of the address translation request; receive a restart message from the PRI handler upon the PRI handler receiving a page miss response from the TA; and restart command arbitration on the submission queue that was paused responsive to the restart message.

20 Claims, 15 Drawing Sheets

800

Buffer, within a set of request staging queues of an address translation circuit, address translation requests received from host interface circuits and each comprising a virtual address.
810

Store, within a set of pending response queues, respective address translation requests that are waiting for an address translation from a host system while maintaining an order as received within the set of request staging queues.
820

Reorder, within a set of reordering buffers, address translations according to the order maintained within the set of pending response queues, wherein each address translation comprises a PA mapped to a respective VA.
830

Send, from the reordering buffers, the address translations to a corresponding host interface circuit of the host interface circuits that sent a corresponding address translation request.
840

Store, in a cache coupled with the set of request staging queues and the set of reordering buffers, the address translations associated with the address translations requests for future access by the host interface circuits.
850

Reinsert, into the set of reordering buffers, a first address translation from the cache for a subsequent request for the first address translation by a host interface circuit.
860

Store, in a cache, multiple address translations associated with address translation requests from multiple host interface circuits and each including a virtual address, the address translations for future access by the host interface circuits.
1110

Track, by a page request interface (PRI) handler, translation miss messages received from the host interface circuits, each translation miss message including the virtual address of a miss at the cache.
1120

Remove duplicate translation miss messages having an identical virtual address.
1130

Create multiple page miss requests from non-duplicate translation miss messages that are categorized into page request groups, each page request group corresponding to a host interface circuit of thef host interface circuits.
1140

Queue, by the PRI handler, the page request groups to be sent to a translation agent (TA) of a host system.
1150

Store, in a cache, address translations associated with address translation requests from a host queue interface circuit, each address translation including a virtual address.
1210

Pause, by the host queue interface circuit, command fetch arbitration on a submission queue of a host system that is targeted by an address translation request that has missed at the cache.
1220

Trigger a page request interface (PRI) handler to send a page miss request to a translation agent of the host system, the page miss request including a virtual address of the address translation request.
1230

Receive a restart message from the PRI handler upon the PRI handler receiving a page miss response from the translation agent.
1240

Restart, by the host queue interface circuit, command arbitration on the submission queue that had been paused responsive to the restart message.
1250

```
┌─────────────────────────────────────────────────────────────────────┐
│ Detect an address translation request for a completion request that │
│ misses at the cache, the completion request being buffered within a │
│ particular completion request queue of the set of completion        │
│ request queues and associated with an entry in a completion queue   │
│ of the host system.                                                  │
│ 1410                                                                 │
└─────────────────────────────────────────────────────────────────────┘
                                    │
                                    ▼
┌─────────────────────────────────────────────────────────────────────┐
│ Pause the particular completion request queue in response to the    │
│ detected miss.                                                       │
│ 1420                                                                 │
└─────────────────────────────────────────────────────────────────────┘
                                    │
                                    ▼
┌─────────────────────────────────────────────────────────────────────┐
│ Trigger a page request interface (PRI) handler to send a page miss  │
│ request to a translation agent of the host system, the page miss    │
│ request including a virtual address of the address translation      │
│ request.                                                             │
│ 1430                                                                 │
└─────────────────────────────────────────────────────────────────────┘
                                    │
                                    ▼
┌─────────────────────────────────────────────────────────────────────┐
│ Receive a restart message from the PRI handler upon the PRI handler │
│ receiving a page miss response from the translation agent.          │
│ 1440                                                                 │
└─────────────────────────────────────────────────────────────────────┘
                                    │
                                    ▼
┌─────────────────────────────────────────────────────────────────────┐
│ Restart the particular completion request queue responsive to the   │
│ restart message.                                                     │
│ 1450                                                                 │
└─────────────────────────────────────────────────────────────────────┘
```

FIG. 14

PAGE REQUEST INTERFACE SUPPORT IN HANDLING HOST SUBMISSION QUEUES AND COMPLETION AUTOMATION ASSOCIATED WITH CACHING HOST MEMORY ADDRESS TRANSLATION DATA

REFERENCE TO RELATED APPLICATION

This application claims the benefit of U.S. Provisional Patent Application No. 63/427,561, filed Nov. 23, 2022, the entirety of which is incorporated herein by reference.

TECHNICAL FIELD

The present disclosure generally relates to a memory system, and more specifically, relates to page request interface support in handling host submission queues and completion automation associated with caching host memory address translation data in a memory sub-system.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIG. 8 is a flow chart of an example method of caching host memory address translation data in a memory sub-system in accordance with some embodiments.

FIG. 11 is a flow chart of an example method of page request interface support in caching host memory address translation data in a memory sub-system in accordance with some embodiments.

FIG. 12 is a flow chart of an example method of page request interface support in handling host submission queues in caching host memory address translation data in a memory sub-system in accordance with some embodiments.

FIG. 14 is a flow chart of an example method of page request interface support in handling completion automation in caching host memory address translation data in a memory sub-system in accordance with some embodiments.

DETAILED DESCRIPTION

Figure 1:
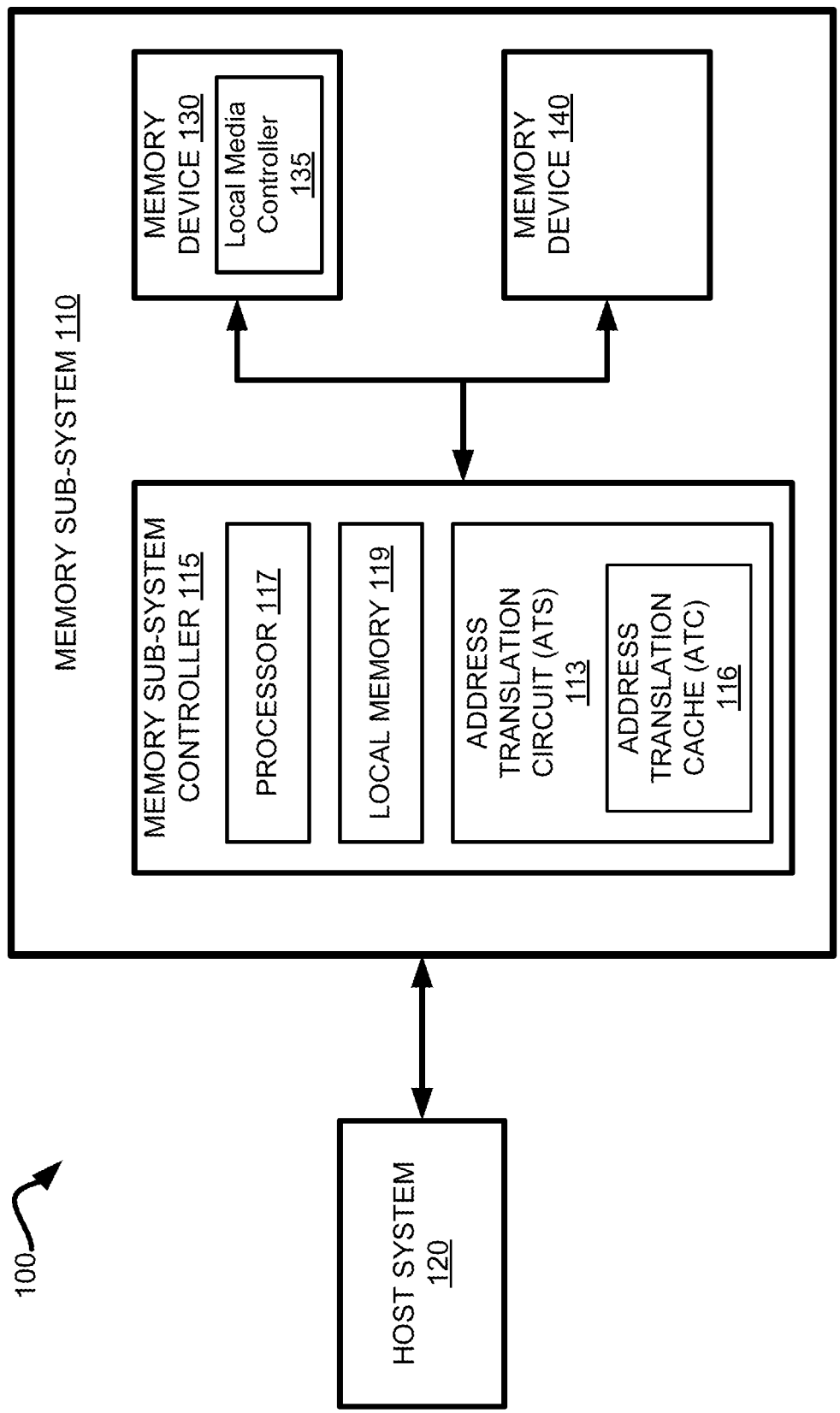
FIG. 1 illustrates an example computing environment for page request interface support in caching host memory address translation data in a memory sub-system in accordance with some embodiments of the present disclosure.

Aspects of the present disclosure are directed to page request interface support in caching host memory address translation data in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system.

In requesting data be written to or read from a memory device, the host system typically generates memory commands (e.g., an erase (or unmap) command, a write command, or a read command) that are sent to a memory sub-system controller (e.g., processing device or "controller"). The controller then executes these memory commands to perform an erase (or unmap) operation, a write operation, or a read operation at the memory device. Because the host operates in logical addresses, which are referred to as virtual addresses (or guest physical addresses) in the context of virtual machines (VMs) that run on the host system, the host system includes a root complex that serves as a connection between the physical and virtual components of the host system and a peripheral control interconnect express (PCIe) bus. This PCIe root complex can generate transaction requests (to include address translation) requests on behalf of entities of the host system, such as a virtual processing device in one of the VMs.

The host system typically further includes a translation agent (TA) that performs translations, on behalf of the controller, of virtual addresses to physical addresses. To do so, the TA is configured to communicate with translation requests/responses through the PCIe root complex. In some systems, the TA is also known as an input/output memory management unit (IOMMU) that is executed by a hypervisor or virtual machine manager running on the host system. Thus, the TA can be a hardware component or software (IOMMU) with a dedicated driver.

The controller in these systems can be configured to include an address translation circuit, more specifically referred to as an address translation service (ATS), that is to request the TA to perform certain address translations from a virtual (or logical) address to an available (or assigned) physical address of the memory device. In this way, the address translation circuit (or ATS) dynamically determines address translations based on the virtual address located in a corresponding memory command that is queued within host memory. Different aspects of the ATS obviate the need to pin a substantial amount of memory associated with an application being run by the host system.

Especially in support of multiple non-volatile memory express (NVMe) devices, the need to continually request the TA to perform address translations is a bottleneck and affects performance in terms of speed, latency, and quality-of-service in fulfilling memory commands. Performance can be increasingly impacted as submission, completion, I/O, and administrative queues located within the host memory get larger and the speeds of media of the memory devices increase. For example, the number of address translation requests and responses for command queues as well as for direct memory access (DMA) addresses can be slowed by having to move back and forth across the PCIe bus, which also generates additional I/O traffic that slows the entire memory sub-system.

Aspects of the present disclosure address the above and other deficiencies by implementing, within the address translation circuit of host interface circuitry within the controller, an address translation cache (ATC) that stores address translations corresponding to incoming address translation requests from host interface (HIF) circuits of the host interface circuitry. The ATC can store the address translations, associated with the address translation requests, for future access by the host interface circuits. These address translation requests, for example, may be related to processing of memory commands as well as the handling of DMA operations or commands. In this way, when a cached address translation matches a subsequent (or later) address translation request from a HIF circuit (e.g., hits at the cache), the address translation circuit can retrieve and return the cached address translation to the HIF circuit without having to request the TA to perform the translation on behalf of the controller.

In some embodiments, for each memory command within a submission queue of the host memory, the address translation circuit can store a first address translation in the ATC corresponding to a current page targeted by the memory command (referenced in an address translation request) and store a second address translation in the ATC for a subsequent page that sequentially follows the current page according to virtual address numbering. This look-ahead buffering in the ATC of address translations for a predetermined number of submission queues enables greatly reducing the number of misses at the ATC while keeping a size of the ATC reasonable given the expense of cache memory, e.g., static random access memory (SRAM), availability at the controller. The hit rate at the cache can further be increased by this approach when the command (and other) queues in the host memory are arranged to sequentially store memory commands according to virtual addresses.

In most devices or systems, DMA operations cannot handle page faults, e.g., there is no way to resolve the page faults (such as via paging) to successfully perform a given DMA command. To prevent page faults with DMA operations, the host system pins pages in host memory (whether source or destination of a DMA) before a driver submits I/O data to the device. Pinning a page within the host address space of memory guarantees immediate execution of a DMA operation when triggered by an interrupt. If an I/O device supports a large amount of pre-allocated queues and data buffers, a significant chunk of host memory is reserved upfront even if the I/O device is not using all this pinned memory at the same time. For most applications and workload situations, all that pinned memory typically sits idle.

Thus, while the address translation circuit would seem to enable the ability to forgo pinning of memory (by accessing the ATC), there are instances of missing at the ATC (or cache of the ATS), which would generate the need for paging memory. But, because DMA operations do not support page faults, the address translation circuit may still be an incomplete solution for DMA operations. In order to resolve this problem, in some embodiments, an additional page interface request (PRI) handler is added to the host interface design that automates, from a memory controller perspective, sending PRI-related page miss requests to the host system to request the host system re-pin a physical page of memory to a virtual address of each respective page miss request, thus making these pages available again in host memory.

In some embodiments, for example, the PRI handler tracks translation miss messages received from the host interface circuits, each translation miss message including a virtual address of a miss at the cache. The PRI handler can further remove duplicate translation miss messages having an identical virtual address, e.g., due overlap in virtual addresses concurrently coming from multiple host interface circuits. The PRI handler can further create page miss requests from non-duplicate translation miss messages that are categorized into page request groups. For example, a page request group corresponds to one of the host interface circuits.

In these embodiments, the PRI handler further queues the page request groups to be sent to a translation agent of the host system, e.g., for handling of the page miss requests and sending back confirmations in the form of page request responses. In some embodiments, the page request responses trigger the PRI handler to send out restart messages to the host interface circuits along with identification of which hardware pipeline portion or queue that can be restarted now that the page is available in memory. In these embodiments, the address translations to pages that have been re-pinned can further be stored in the ATC for future accesses by any of the HIF circuits.

Therefore, advantages of the systems and methods implemented in accordance with some embodiments of the present disclosure include, but are not limited to, improving performance of the memory sub-system in terms of speed, latency, and throughput of handling memory commands. Part of the reason for increased performance is reducing the I/O traffic over the PCIe buses of the memory sub-system and at the host TA. The disclosed address translation circuit can also reduce the likelihood that previously cached translations will be invalidated and have to be re-fetched from the TA of the host system. Additional advantages of the PRI handler involvement in the caching of host memory address translation data in the memory sub-system include avoiding the need to pin large amounts of host memory to support DMA operations or the like by requesting pages be re-pinned when needed. Other advantages will be apparent to those skilled in the art of address translations within memory sub-systems, which will be discussed hereinafter. Additional details of these techniques are provided below with respect to FIGS. 1-14.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include NOT-AND (NAND) type flash memory and write-in-place memory, such as three-dimensional cross-point ("3D cross-point") memory. A 3D cross-point memory device is a cross-point array of non-volatile memory cells that can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased.

Each of the memory devices 130 can include one or more arrays of memory cells such as single level cells (SLCs), multi-level cells (MLCs), triple level cells (TLCs), or quad-level cells (QLCs). In some embodiments, a particular memory component can include an SLC portion, and an MLC portion, a TLC portion, or a QLC portion of memory cells. Each of the memory cells can store one or more bits of data used by the host system 120. Furthermore, the memory cells of the memory devices 130 can be grouped to form pages that can refer to a unit of the memory component used to store data. With some types of memory (e.g., NAND), pages can be grouped to form blocks. Some types of memory, such as 3D cross-point, can group pages across die and channels to form management units (MUs).

Although non-volatile memory components such as NAND type flash memory and 3D cross-point are described, the memory device 130 can be based on any other type of non-volatile memory, such as read-only memory (ROM), phase change memory (PCM), magneto random access memory (MRAM), NOT-OR (NOR) flash memory, electrically erasable programmable read-only memory (EEPROM).

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. In some embodiments, the memory devices 130 are managed memory devices, which is a raw memory device combined with a local controller (e.g., local media controller 135) for memory management within the same memory device package. An example of a managed memory device is a managed NAND (MNAND) device.

The memory sub-system 110 includes an address translation circuit 113 and an address translation cache (or ATC 116) that can be used to perform caching of host memory address translation data used for queues, physical page regions (PRPs) scatter gather lists (SGLs), and data transfer in the memory sub-system 110. For example, the address translation circuit 113 can receive an address translation request from a HIF circuit that is handling a memory command, request the TA perform a translation of a virtual address located within the memory command, and upon receiving the physical address, store a mapping between the virtual address and the physical address (also referred to as L2P mapping) in the ATC 116. Upon receiving a subsequent address translation request that contains the same virtual address, the address translation circuit 113 can verify that the virtual address is a hit at the ATC 116 and directly copy the corresponding address translation from the ATC to a pipeline of the address translation circuit 113 that returns the corresponding address translation to the requesting HIF circuit. Similar caching of address translations can also be performed for DMA operations, which will be discussed in more detail. Further details with regards to the operations of the address translation circuit 113 and the ATC 116 are described below.

Figure 2:
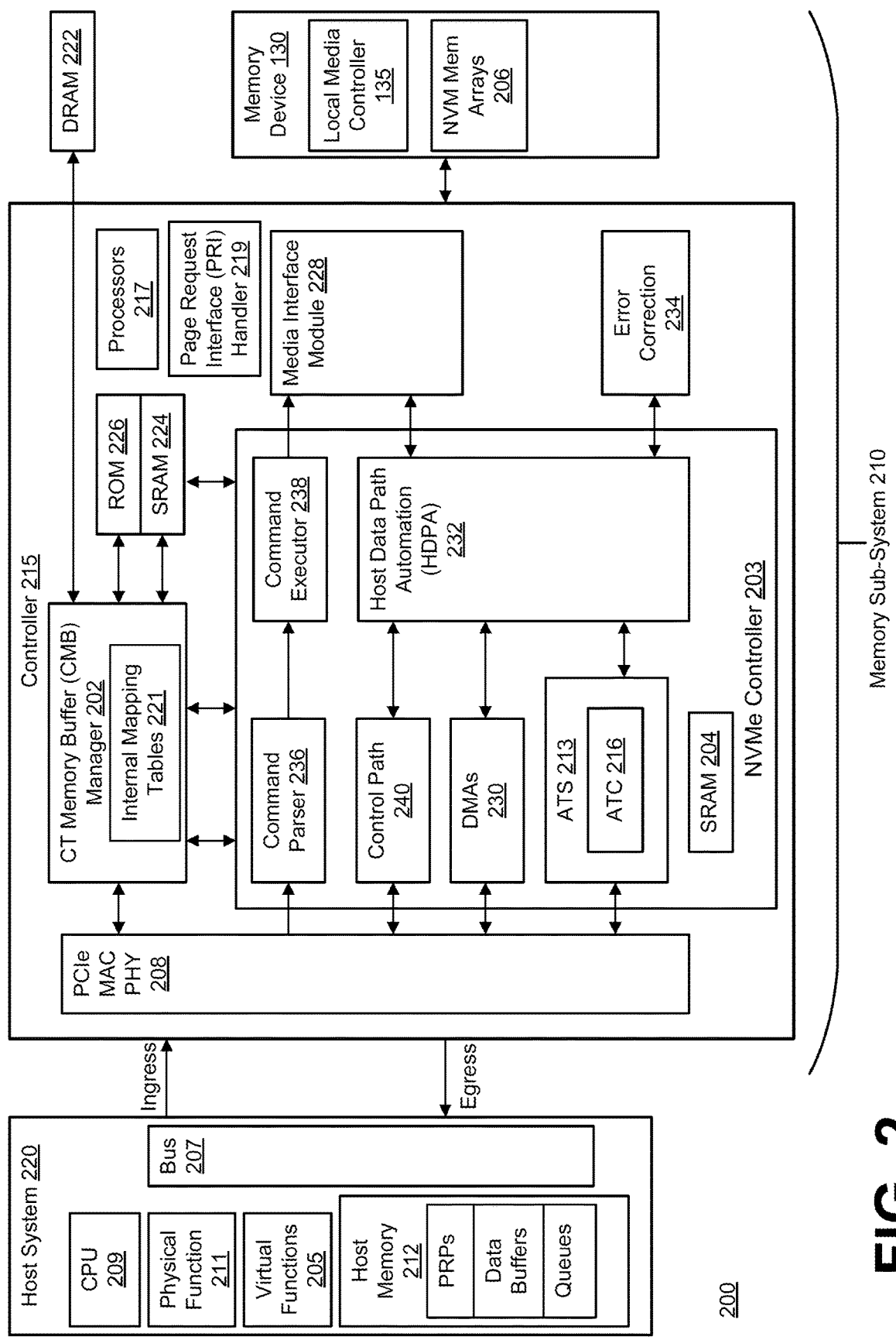
FIG. 2 is a schematic block diagram of a system (or device) implementing peripheral component interface express (PCIe) and non-volatile memory express (NVMe) functionality within which the disclosed page request interface support operates in accordance with some embodiments.

FIG. 2 is a schematic block diagram of a system 200 (or device) implementing peripheral component interface express (PCIe) and non-volatile memory express (NVMe) functionality within which the disclosed page request interface support operates in accordance with some embodiments. In various embodiments, the system 200 includes a host system 220 (such as the host system 120), a memory sub-system 210 (such as the memory sub-system 110) that in turn includes a controller 215 (such as the controller 115), or more memory device(s) 130, and DRAM 222. In some embodiments, aspects (to include hardware and/or firmware functionality) of the controller 215 is included in the local media controller 135.

In embodiments, the host system 220 includes a central processing unit (CPU) 209 connected to a host memory 212, such as DRAM or other main memories. An application program may be stored to memory space 212 for execution by components of the host system 220. The host system 220 includes a bus 207, such as a memory device interface, which interacts with a host interface 208, which may include media access control (MAC) and physical layer (PHY) components, of memory device 130 for ingress of communications from host system 220 to memory device 130 and egress of communications from memory device 130 to host system 220. Bus 207 and host interface 208 operate under a communication protocol, such as a Peripheral Component Interface Express (PCIe) serial communication protocol or other suitable communication protocols. Other suitable communication protocols include Ethernet, serial attached SCSI (SAS), serial AT attachment (SATA), any protocol related to remote direct memory access (RDMA) such as Infiniband, iWARP, or RDMA over Converged Ethernet (RoCE), and other suitable serial communication protocols.

Memory device 130 may also be connected to host system 220 through a switch or a bridge. A single host system 220 is shown connected with the memory device 130, and the PCI-SIG Single Root I/O Virtualization and Sharing Specification (SR-IOV) single host virtualization protocol supported as discussed in greater detail below, where the memory device 130 may be shared by multiple hosts, where the multiple hosts may be a physical function 211 (PF) and one or more virtual functions 205 (VFs) of a virtualized single physical host system. In other embodiments, it is contemplated that the SR-IOV standard for virtualizing multiple physical hosts may be implemented with features of the disclosed system and method.

In embodiments, the non-volatile memory arrays (or NVM 206) of memory device 130 may be configured for long-term storage of information as non-volatile memory space and retain information after power on/off cycles. In the same manner as described with respect to FIG. 1. NVM 206 in FIG. 2 can include one or more dice of NAND type flash memory or other memory discussed with reference to FIG. 1.

The memory sub-system 210 includes a controller 215 (e.g., processing device) which manages operations of memory device 130, such as writes to and reads from NVM 206. Controller 215 may include one or more processors 217, which may be multi-core processors. Processors 217 can handle or interact with the components of memory device 130 generally through firmware code.

Controller 215 may operate under NVM Express (NVMe) protocol, but other protocols are applicable. The NVMe protocol is a communications interface/protocol developed for SSDs to operate over a host and a memory device that are linked over a PCIe interface. The NVMe protocol provides a command queue and completion path for access of data stored in memory device 130 by host system 220.

Controller 215 also includes a controller memory buffer (CMB) manager 202. CMB manager 202 may be connected to the DRAM 222, to a static random access memory (SRAM) 224, and to a read-only memory (ROM) 226. The CMB manager 202 may also communicate with the NVM 206 through a media interface module 228. The DRAM 222 and SRAM 224 are volatile memories or cache buffer(s) for short-term storage or temporary memory during operation of memory device 130. In some embodiments. SRAM 224 includes tightly-coupled memory as well. Volatile memories do not retain stored data if powered off. The DRAM generally requires periodic refreshing of stored data while SRAM does not require refreshing. While SRAM typically provides faster access to data than DRAM, it may also be more expensive.

Controller 215 executes computer-readable program code (e.g., software or firmware) executable instructions (herein referred to as "instructions"). The instructions may be executed by various components of controller 215, such as processor 218, logic gates, switches, application specific integrated circuits (ASICs), programmable logic controllers, embedded microcontrollers, and other components of controller 215.

The instructions executable by the controller 215 for carrying out the embodiments described herein are stored in a non-transitory computer-readable storage medium. In certain embodiments, the instructions are stored in a non-transitory computer readable storage medium of memory device 130, such as in a read-only memory (ROM) or NVM 206. Instructions stored in the memory device 130 may be executed without added input or directions from the host system 220. In other embodiments, the instructions are transmitted from the host system 220. The controller 215 is configured with hardware and instructions to perform the various functions described herein and shown in the figures.

Controller 215 may also include other components, such as a NVMe controller 203, a media interface module 228 coupled between the NVMe controller 203 and the memory device 130, and an error correction module 234. In embodiments, the NVMe controller 203 includes SRAM 204, an address translation circuit 213 (ATS) having an address translation cache 216, a direct memory access (DMA) module 230, a, host data path automation (HDPA) circuit 232, a command parser 236, a command executor 238, and a control path 240. In various embodiments, the address translation circuit 213 is the same as the address translation circuit 113 and the address translation cache 216 is the same as the address translation cache 116, all of which will be discussed in more detail hereinafter. The SRAM 204 may be internal SRAM of the NVMe controller 203 that is separate from the SRAM 224. The CMB manager 202 may be directly coupled to the NVMe controller 203 such that the NVMe controller 203 can interact with the CMB manager 202 to access the DRAM 222 and SRAM 224.

In embodiments, the media interface module 228 interacts with the NVM 206 for read and write operations. DMA module 230 executes data transfers between host system 220 and memory device 130 without involvement from CPU 209. The HDPA circuit 232 controls the data transfer while activating the control path 240 for fetching PRPs/SGLs, posting completion and interrupts, and activating the DMAs 230 for the actual data transfer between host system 220 and memory device 130. Error correction module 234 corrects the data fetched from the memory arrays in the NVM 206. Command parser 236 parses commands to command executor 238 for execution on media interface module 228.

In embodiments, the controller 215 further includes a page request interface (PRI) handler 219 coupled to or integrated with the processors 217 and the host interface 208, as will be discussed in more detail. The PRI handler 219 may be processing logic that can include hardware (e.g., processing device, circuitry, dedicated logic, programmable logic, microcode, hardware of a device, integrated circuit, etc.), firmware (e.g., instructions run or executed on the processors 217), or a combination thereof.

In various embodiments, the PRI handler 219 automates, from a perspective of the host interface 208 of the memory controller 215, sending page miss requests to the host system 120 and detecting and handling page request responses returned from the host system 120. The page miss requests request a translation agent of the host system 120 to re-pin a physical page of the host memory 212 to a virtual address of each respective page miss request, thus making these pages available again in the host system 220. In some cases, the re-pinning of the page in the host memory 212 involves finding a valid virtual address to map to an existing physical address (where data is still stored), and completing the mapping for which an address translation can be returned to the controller 215. Each page request response may include a confirmation that a respective page has been re-pinned in memory as well as the address translation for the pinned page.

Figure 3:
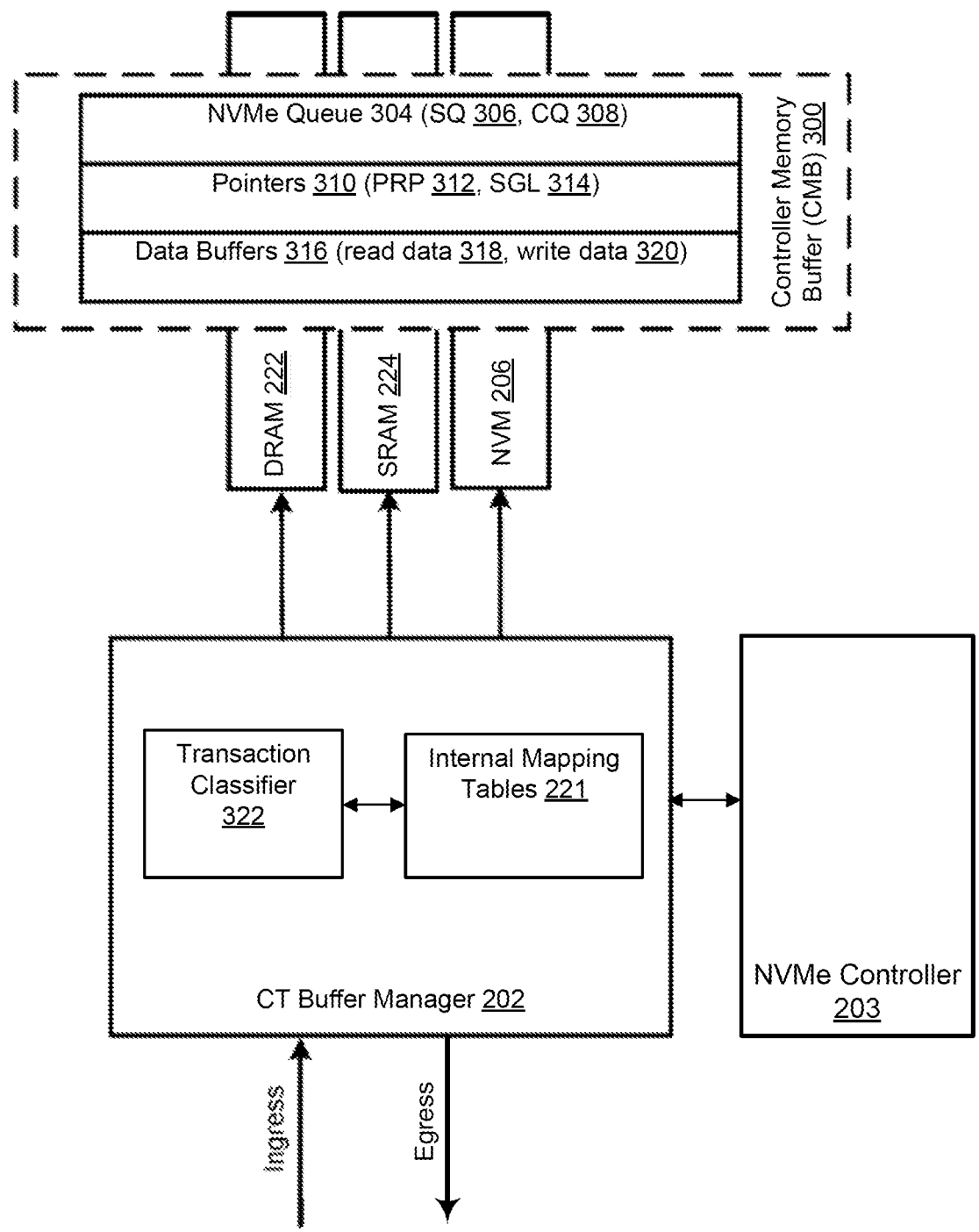
FIG. 3 is a schematic diagram illustrating an embodiment of a controller memory buffer (CMB) manager of a storage device.

FIG. 3 is a schematic diagram illustrating an embodiment of the CMB manager 202 of system 200 of FIG. 2, but other systems are possible. The CMB manager 202 manages data transactions between host system 220 and a memory device 130 having a controller memory buffer (CMB) 300. The CMB 300 and is a controller memory space which may span across one or more of the DRAM 222, SRAM 224, and/or NVM 206. The contents in CMB 300 typically do not persist across power cycles, so the CMB manager 202 can rebuild the CMB 300 after the system 200 powers on.

One or more types of data structures defined by the NVMe protocol may be stored in the CMB 300 by the CMB manager 202 or may be stored in host memory 212 (FIG. 2). As described in greater detail below, the host system 220 may initialize the CMB 300 prior to CMB manager 202 storing NVMe data structures thereto. At initialization phase, memory device 130 may advertise to host system 220 the capability and the size of CMB 300 and may advertise which NVMe data structures may be stored into CMB 300. For example, memory device 130 may store one or more of the NVMe data, structures into CMB 300, including NVMe queues 304 such as submission queues (SQ) 306, completion queues (CQ) 308, PRP lists 312. SGL segments 314, write data 320, read data 318, and combinations thereof.

The NVMe protocol standard is based on a paired submission and completion queue mechanism. Commands are placed by host software into a submission queue (SQ). Completions are placed into the associated completion queue (CQ) by the controller 215. The host system 220 (or device) may have multiple pairs of submission and completion queues for different types of commands. Responsive to a notification by the host system 220, the controller 215 fetches the command from the submission queue (e.g., one of the SQs 306). Thereafter, the controller 215 processes the command. e.g., performs internal command selection, executes the command (such as performing a write or a read), and the like. After processing the command, the controller 215 places an entry in the completion queue, with the entry indicating that the execution of the command has completed. The controller 215 then generates an interrupt to the host device indicating that an entry has been placed on the completion queue. The host system 220 reviews the entry of the completion queue and then notifies the controller 215 that the entry of the completion queue has been reviewed. As will be discussed in more detail, the address translation circuit 213 may help perform these functions of the controller 215.

In general, submission and completion queues are allocated within the host memory 212 where each queue might be physically located contiguously or non-contiguously in the host memory. However, the CMB feature, such as is supported in the NVMe standard, enables the host system 220 to place submission queues, completion queues, physical page region (PRP) lists, scatter gather list (SGL) segments and data buffers in the controller memory rather than in the host memory 212.

The controller 215 (FIG. 2) also generates internal mapping tables 221 for use by the CMB manager 202 to map PF and VF data to the correct CMB locations in controller memory DRAM 222 or SRAM 224. The mapping table 221 itself is typically stored in flip-flops or the DRAM 222 to reduce or eliminate any latency issues. In one implementation, the mapping table may have entries for the PF and each VF, for example.

The NVMe standard supports an NVMe virtualization environment. Virtualized environments may use an NVM system with multiple controllers to provide virtual or physical hosts (also referred to herein as virtual or physical functions) direct input/output (I/O) access. The NVM system includes of primary controller(s) and secondary controller(s), where the secondary controller(s) depend on primary controller(s) for dynamically assigned resources. A host may issue the Identify command to a primary controller specifying the Secondary Controller List to discover the secondary controllers associated with that primary controller. The SR-IOV defines extensions to PCI Express that allow multiple System Images (SIs), such as virtual machines running on a hypervisor, to share PCI hardware resources (see FIG. 4).

A physical function (PF) is a PCIe function that supports the SR-IOV capability, which in turn allows it to support one or more dependent virtual functions (VFs). These PFs and VFs may support NVMe controllers that share an underlying NVM subsystem with multi-path I/O and namespace sharing capabilities. In such a virtualization environment, the physical function, sometimes referred to as the primary function, and each virtual function is allocated its own CMB that is a portion of the total controller memory available for CMB use. As used herein, the term physical function refers to a PCIe function that supports SR-IOV capabilities where a single physical host is divided into the physical function and multiple virtual functions that are each in communication with the controller of the memory device. The terms physical function and primary function may be used interchangeably herein.

In an embodiment, the controller 215 advertises the CMB 300 availability only to the physical function (PF) of a virtualized host system such as the host system 220, where a virtualized host system has a single physical function 211 and one or more virtual functions 205 (or VFs). Also, the advertised CMB 300 availability may be in the form of a total CMB size available for all functions (physical and any virtual functions) such that the physical function 211 may selectively assign itself and all other virtual functions 205 any desired portion of the advertised total CMB size available.

The controller 215 may then store the physical function selected portions of the available CMB 300 in NVMe registers dedicated to each physical function 211 and virtual function, respectively. The virtual function may store a different relative portion size of the advertised CMB size in each NVMe register to account for the different needs the physical function 211 sees for itself and each virtual function. Once the physical function 211 assigns the different amounts and regions of the advertised CMB available for host access (e.g. for direct access by the primary and virtual functions) during the initiation stage, these settings may be managed by the controller 215 to provide access to the respective primary or virtual functions during operations of the memory device.

Controller buffer manager 202 may include a transaction classifier module 322 to classify received host write transactions to CMB 300. Host write transactions to CMB 300 may be associated with host write command and host read commands. In certain embodiments, transaction classifier module 322 may classify the host write transactions into one of the three NVM data structure groups of NVMe queues 304, pointers 310, and data buffers 316. NVMe queues 304 include host submission queues (SQs) 306 and host completion queues (CQs) 308. Pointers 310 may include physical region pages (PRP) lists 312 and scatter gather list (SGL) segments 314. PRP lists 312 contain pointers indicating physical memory pages populated with user data or going to be populated with user data, such as for read or write commands in NVMe queues 304. SGL segments 314 include pointers indicating the physical addresses of host memory 212 in which data should be transferred from for write commands and in which data should be transferred to for read commands. Data buffers 316 may contain write data 320 to be written to NVM 206 associated with a write command and/or read data 318 from memory device 130 associated with a read command.

In certain embodiments, NVMe queues 304, pointers 310, and data buffers 316 associated with a particular command may be stored in the CMB 300 by CMB manager 202 to reduce command execution latency by the memory device 130. For example, a host command entry written to SQs-implemented CMB 300 avoids fetching the host command entry through the PCIe fabric which may include multiple switches if the SQ is located in the host memory 212. PRP lists 312 and SGL segments 314 written to CMB 300 of memory device 130 avoids a separate fetch of the PRP lists 312 and SGL segments 314 through the PCIe fabric if the PRP lists and SGL segments are located in host memory space. Write data 320 written to CMB 300 of memory device 130 avoid having memory device 130 fetch the write data from host memory 212.

The address translation circuit 213 may communicate through the host interface 208 with the host system 220 and components of the memory sub-system 210. The address translation circuit 213 may also be incorporated, at least in part, within the host interface 208, as will be discussed in more detail. The address translation circuit 213 may also retrieve commands from SQs 306, handle the commands to include retrieving the address translation from the ATC 216, if present, and submit a completion notification to the CQs 308 for the host system 220. Thus, in at least some embodiments, the address translation circuit 213 may include or be integrated with the command parser 236, the command executor 238, and the DMAs 230.

Figure 4:
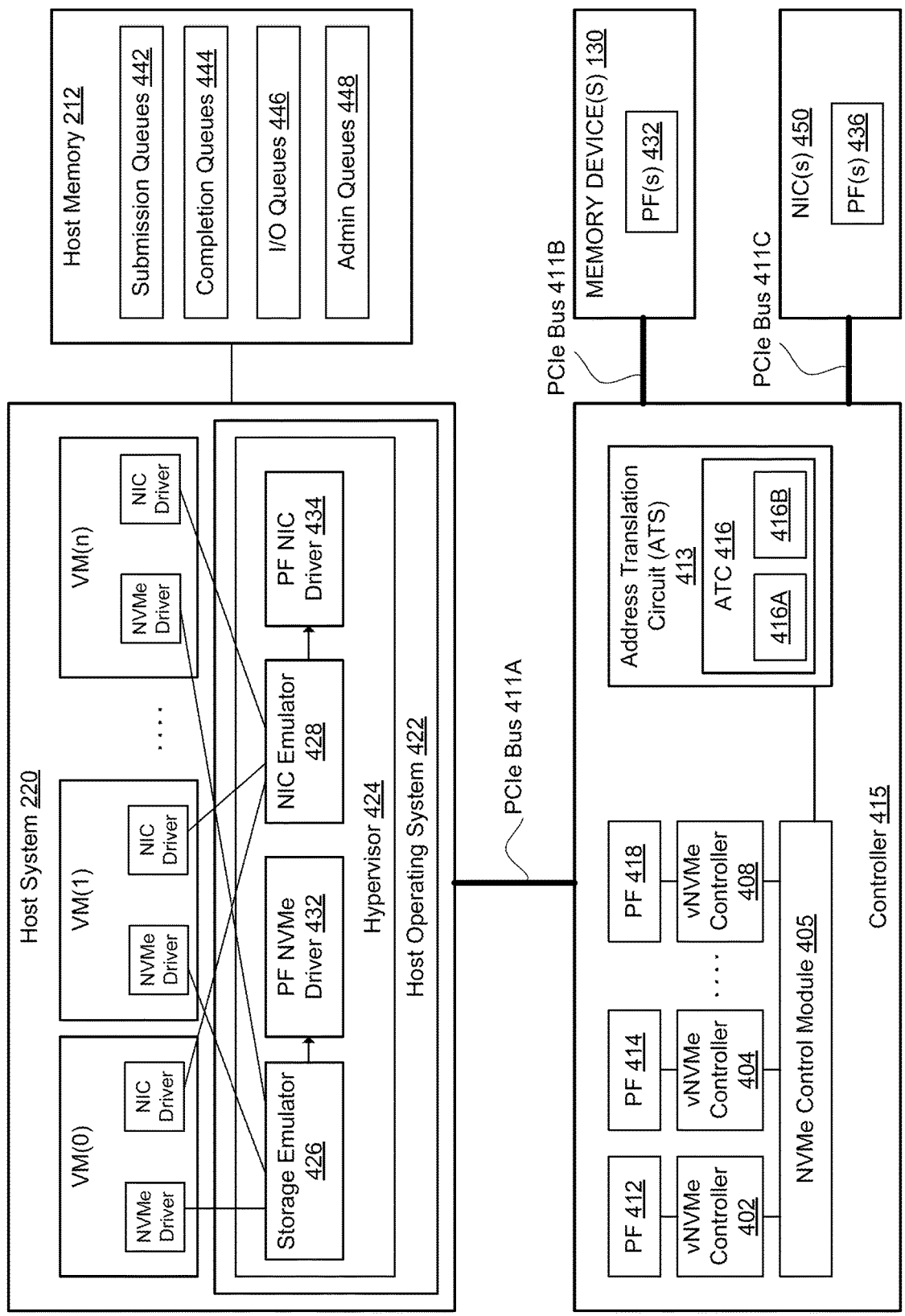
FIG. 4 is an example physical host interface between a host system and a memory sub-system implementing caching host memory address translation data in accordance with some embodiments.

FIG. 4 is an example physical host interface between a host system 220 and a memory sub-system implementing caching host memory address translation data in accordance with some embodiments. In at least some embodiments, the example physical host interface also implements NVMe direct virtualization, as was discussed with reference to FIGS. 2-3. In one embodiment, a controller 415 of the memory sub-system is coupled to host system 220 over a physical host interface, such as a PCIe bus 411A. In one embodiment, a NVMe control module 405 running on the controller 415 generates and manages a number of virtual NVMe controllers 402-408 within the controller 415. The virtual NVMe controllers 402-408 are virtual entities that appear as physical controllers to other devices, such as the host system 220, connected to PCIe bus 411A by virtue of a physical function 412-418 associated with each virtual NVMe controller 402-408. FIG. 4 illustrates three virtual NVMe controllers 402-408 and three corresponding physical functions 412-418. In other embodiments, however, there may be any other number of NVMe controllers, each having a corresponding physical function.

Each of the virtual NVMe controllers 402-408 manages storage access operations for the underlying memory device 130. For example, virtual NVMe controller 402 may receive data access requests from host system 220 over PCIe bus 411A, including requests to read, write, or erase data. In response to the request, virtual NVMe controller 402 may identify a physical memory address in memory device 130 pertaining to a virtual memory address in the request, perform the requested memory access operation on the data stored at the physical address and return requested data and/or a confirmation or error message to the host system 220, as appropriate. Virtual NVMe controllers 404-408 may function in the same or similar fashion with respect to data access requests for one or more memory device(s) 130.

In embodiments, a NVMe control module 405 associates one of physical functions 412-418 with each of virtual NVMe controllers 402-408 in order to allow each virtual NVMe controller 402-408 to appear as a physical controller on the PCIe bus 411A. For example, physical function 412 may correspond to virtual NVMe controller 402, physical function 414 may correspond to virtual NVMe controller 404, and physical function 418 may correspond to virtual NVMe controller 408. Physical functions 412-418 are fully featured PCIe functions that can be discovered, managed, and manipulated like any other PCIe device, and thus can be used to configure and control a PCIe device (e.g., virtual NVMe controllers 402-408). Each physical function 412-418 can have some number of virtual functions (VFs) associated therewith. The VFs are lightweight PCIe functions that share one or more resources with the physical function and with virtual functions that are associated with that physical function. Each virtual function has a PCI memory space, which is used to map its register set. The virtual function device drivers operate on the register set to enable its functionality and the virtual function appears as an actual PCIe device, accessible by host system 220 over the PCIe bus 411A.

In at least some embodiments, the controller 415 is further configured to control execution of memory operations associated with memory commands from the host system 220 at one or more memory devices(s) 130 and one or more network interface cards (NIC(s)) 450, which are actual physical memory devices. In these embodiments, the controller 415 communicates with the memory devices 130 over a second PCIe bus 411B and communicates with the NICs 450 over a third PCIe bus 411C. Each memory device 130 can support one or more physical functions 432 and each NIC 450 can support one or more physical functions 436. Each physical function 432-436 can also have some number of virtual functions (VFs) associated therewith.

In these embodiments, each physical function 412-418 and 432-436 can be assigned to any one of virtual machines VM(0)-VM(n) in the host system 220. When I/O data is received at a virtual NVMe controller 402-408 from a virtual machine, a virtual machine driver (e.g., NVMe driver) provides a guest physical address for a corresponding read/write command. The NVMe control module 405 can translate the physical function number to a bus, device, and function (BDF) number and then add the command to a direct memory access (DMA) operation to perform the DMA operation on the guest physical address. In one embodiment, the controller 115 further transforms the guest physical address to a system physical address for the memory sub-system 110.

Furthermore, each physical function 412-418 and 432-436 can be implemented in either a privileged mode or normal mode. When implemented in the privileged mode, the physical function has a single point of management that can control resource manipulation and storage provisioning for other functions implemented in the normal mode. In addition, a physical function in the privileged mode can perform management options, including for example, enabling/disabling of multiple physical functions, storage and quality of service (QOS) provisioning, firmware and controller updates, vendor unique statistics and events, diagnostics, secure erase/encryption, among others. Typically, a first physical function can implement a privileged mode and the remainder of the physical functions can implement a normal mode. In other embodiments, however, any of the physical functions can be configured to operate in the privileged mode. Accordingly, there can be one or more functions that run in the privileged mode.

The host system 220 can run multiple virtual machines VM(0)-VM(n), by executing a software layer, often referred to as a hypervisor 424, above the hardware and below the virtual machines, as schematically shown in FIG. 4. In one illustrative example, the hypervisor 424 may be a component of a host operating system 422 executed by the host system 220. Alternatively, the hypervisor 424 may be provided by an application running under the host operating system 422, or may run directly on the host system 220 without an operating system beneath the hypervisor 424. The hypervisor 424 may abstract the physical layer, including processors, memory, and I/O devices, and present this abstraction to virtual machines VM(0)-VM(n) as virtual devices, including virtual processors, virtual memory, and virtual I/O devices. Virtual machines VM(0)-VM(n) may each execute a guest operating system which may utilize the underlying virtual devices, which may, for example, map to the memory device 130 or the NIC 450 managed by one of virtual NVMe controllers 402-408 in the memory sub-system. One or more applications may be running on each VM under the guest operating system.

In various embodiments, each virtual machine VM(0)-VM(n) may include one or more virtual processors and/or drivers. Processor virtualization may be implemented by the hypervisor 424 scheduling time slots on one or more physical processors such that from the perspective of the guest operating system, those time slots are scheduled on a virtual processor. Memory virtualization may be implemented by a page table (PT) which is a memory structure translating guest memory addresses to physical memory addresses. The hypervisor 424 may run at a higher privilege level than the guest operating systems, and the latter may run at a higher privilege level than the guest applications.

In one embodiment, there may be multiple partitions on host system 220 representing virtual machines VM(0)-VM(n). A parent partition corresponding to virtual machine VM(0) is the root partition (i.e., root ring 0) that has additional privileges to control the life cycle of other child partitions (i.e., conventional ring 0), corresponding, for example, to virtual machines VM(1) and VM(n). Each partition has corresponding virtual memory, and instead of presenting a virtual device, the child partitions see a physical device being assigned to them. When the host system 220 initially boots up, the parent partition can see all of the physical devices directly. The pass through mechanism (e.g., PCIe Pass-Through or Direct Device Assignment) allows the parent partition to assign an NVMe device (e.g., one of virtual NVMe controllers 402-408) to the child partitions. The associated virtual NVMe controllers 402-408 may appear as a virtual storage resource to each of virtual machines VM(0), VM(1), VM(n), which the guest operating system or guest applications running therein can access. In one embodiment, for example, virtual machine VM(0) is associated with virtual NVMe controller 402, virtual machine VM(1) is associated with virtual NVMe controller 404, and virtual machine VM(n) is associated with virtual NVMe controller 408. In other embodiments, one virtual machine may be associated with two or more virtual NVMe controllers. The virtual machines VM(0)-VM(n), can identify the associated virtual NVMe controllers using a corresponding bus, device, and function (BDF) number, as will be described in more detail below.

In some embodiments, the hypervisor 424 also includes a storage emulator 426 coupled to the NVMe drivers on the virtual machines VM(0)-VM(n) and that is coupled with a physical function NVMe driver 432 of the hypervisor 424. The physical function NVMe driver 432 can drive, with the help of the virtual NVMe controllers 402-408, the physical functions 412-418 over the PCIe bus 411A and also drive the physical functions 432 available on the memory devices 130 over the PCIe bus 411A and the second PCIe bus 411B. Further, the hypervisor can include a NIC emulator 428 coupled to NIC drivers on the virtual machines VM(0)-VM(n) and that is coupled with a physical function NIC driver 436 of the hypervisor 424. The physical function NIC driver 434 controls the PFs 436 of the NICs 450 over the PCIe bus 411A and the third PCIe bus 411C in various embodiments.

In at least some embodiments, the host system 220 submits memory commands (e.g., erase (or unmap), write, read) to a set of submission queues 442, input/output (I/O) commands to an set of I/O queues 446, and administrative ("admin") commands to a set of admin queues 448, which are stored in the host memory 212 of the host system 220 or in one of the CMB 300 (FIG. 3). The controller 415 can retrieve these memory commands over the PCIe bus 411A and handle each memory command in turn, typically according to a priority (such as handling reads in front of writes). When the controller 415 has completed handling a memory command that resides in the set of submission queues 442, the controller 415 returns an acknowledgement of memory command completion by submitting a completion entry in a corresponding completion queue of a set of completion queues 444, which are also stored in the host memory 212. In some embodiments, the host memory 212 is composed of DRAM or other main memory type memory. In various embodiments, the queues 442, 444, 446, 448 can number into the hundreds (or thousands) and are ordered sequentially (e.g., contiguously) according to virtual addresses of the memory commands. In other words, the queuing of memory commands within these queues is ordered sequentially based on the virtual addresses in those memory commands within a virtual memory space.

In disclosed embodiments, the controller 415 further includes an address translation circuit 413, which includes an ATC 416 (or "cache") similarly introduced with reference to FIGS. 1-3. The ATC 416 may be static random access memory (SRAM), tightly-coupled memory (TCM), or other fast-access memory appropriate for use as cache. The address translation circuit 413 can be coupled to NVMe control module 405 and generally coupled to PCIe protocol components (such as the virtual NVMe controllers) of the controller 415. In this way, the address translation circuit 413 provides host interface circuitry that facilitates obtaining address translations and other handling of memory commands retrieved from the queues 442, 444, 448. The address translation services (ATS) of the address translation circuit 413 further enables direct connection between the one or more memory devices 130 and the virtual machines VM(0)-VM(n) to achieve a near PCIe line rate of data communication performance, which bypasses the hypervisor 424.

As explained, the address translation circuit 413 can receive (or retrieve) an address translation request from a HIF circuit that is handling a memory command, request the TA perform a translation of a virtual address located within the memory command, and upon receiving the physical address, store a mapping between the virtual address and the physical address (also referred to as L2P mapping) in the ATC 416. Upon receiving a subsequent address translation request that contains the same virtual address, the address translation circuit 413 can verify that the virtual address is a hit at the ATC 416 and directly copy the corresponding address translation from the ATC to a pipeline of the address translation circuit 413 that returns the corresponding address translation to the requesting HIF. Similar caching of address translations can also be performed for DMA operations, which will be discussed in more detail. Accordingly, the functionality of the address translation circuit 413 can enable, for many address translation requests, bypassing any need to interact with the hypervisor 424, which being software, is the bottleneck and slows performance of obtaining address translations in the absence of caching such address translations. The resultant speed, latency, and throughput performance increases through the ATS functionality can be significant.

Figure 5:
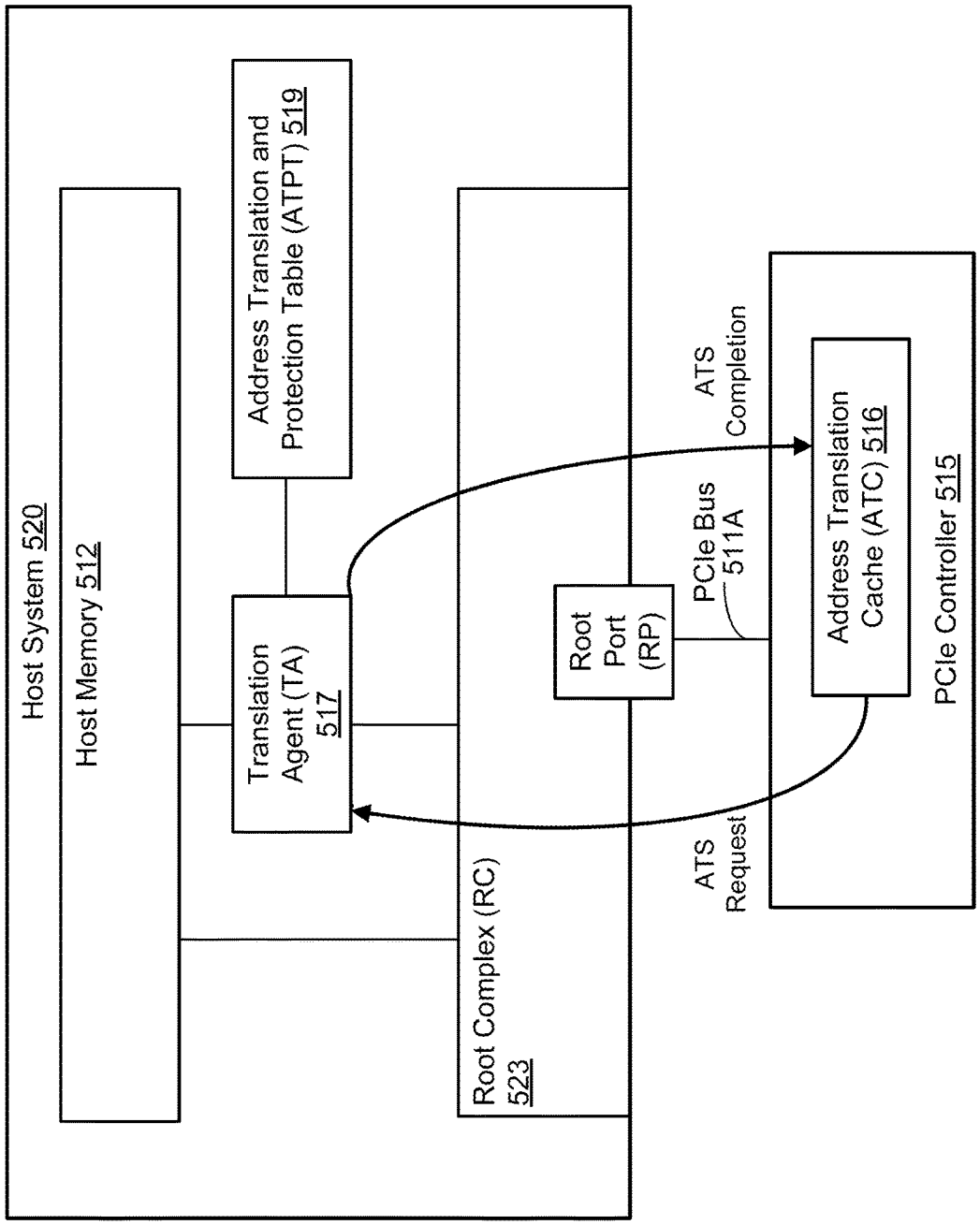
FIG. 5 is a system in which a memory sub-system controller contains an address translation cache (ATC) in accordance with some embodiments.

FIG. 5 is a system 500 in which the memory sub-system controller, such as a PCIe controller 515, contains an address translation cache (ATC) 516 in accordance with some embodiments. Within the system 500, a host system 520 (or any host system discussed herein) includes a translation agent (TA) 517 and an address translation and protection table (ATPT) 519, together which can be employed by the host system 520 to provide address translations to the PCIe controller 515 according to PCIe protocol. Specifically, the TA 517 can return a physical page address in response to a submitted virtual address in an address translation request or a "no translation" in the case the corresponding physical page has been swapped out and thus there is no current translation for the virtual address.

These address translations can be associated with memory commands resident in the host memory 512 (and/or CMB 300) being handled by the PCIe controller 515 (or by other PCIe device or virtual PCIe device). To provide translations, the TA 517 is configured to communicate with address translation requests/responses through a PCIe root complex 523. In some systems, the TA 517 is also known as an input/output memory management unit (IOMMU) that is executed by the hypervisor 424 or virtual machine manager running on the host system 520. Thus, the TA 517 can be a hardware component or software (IOMMU) with a dedicated driver.

In various embodiments, to avoid such increased I/O traffic over a PCIe bus 511A between the host system 520 and the PCIe controller 515, the address translations provided to the PCIe controller 515 can be cached in the ATC 516 and accessed to fulfill later (or subsequent) ATS-generated address translation requests without having to go back to the TA 517 with renewed requests for each needed translation. If entries in the ATC 516 are invalidated due to assignment changes between the virtual and physical addresses within the TA 517 and the ATPT 519, then the PCIe controller 515 (e.g., the ATS in the PCIe controller 515) can purge corresponding entries within the ATC 516 and in other ATS queues in host interface circuitry.

Figure 6:
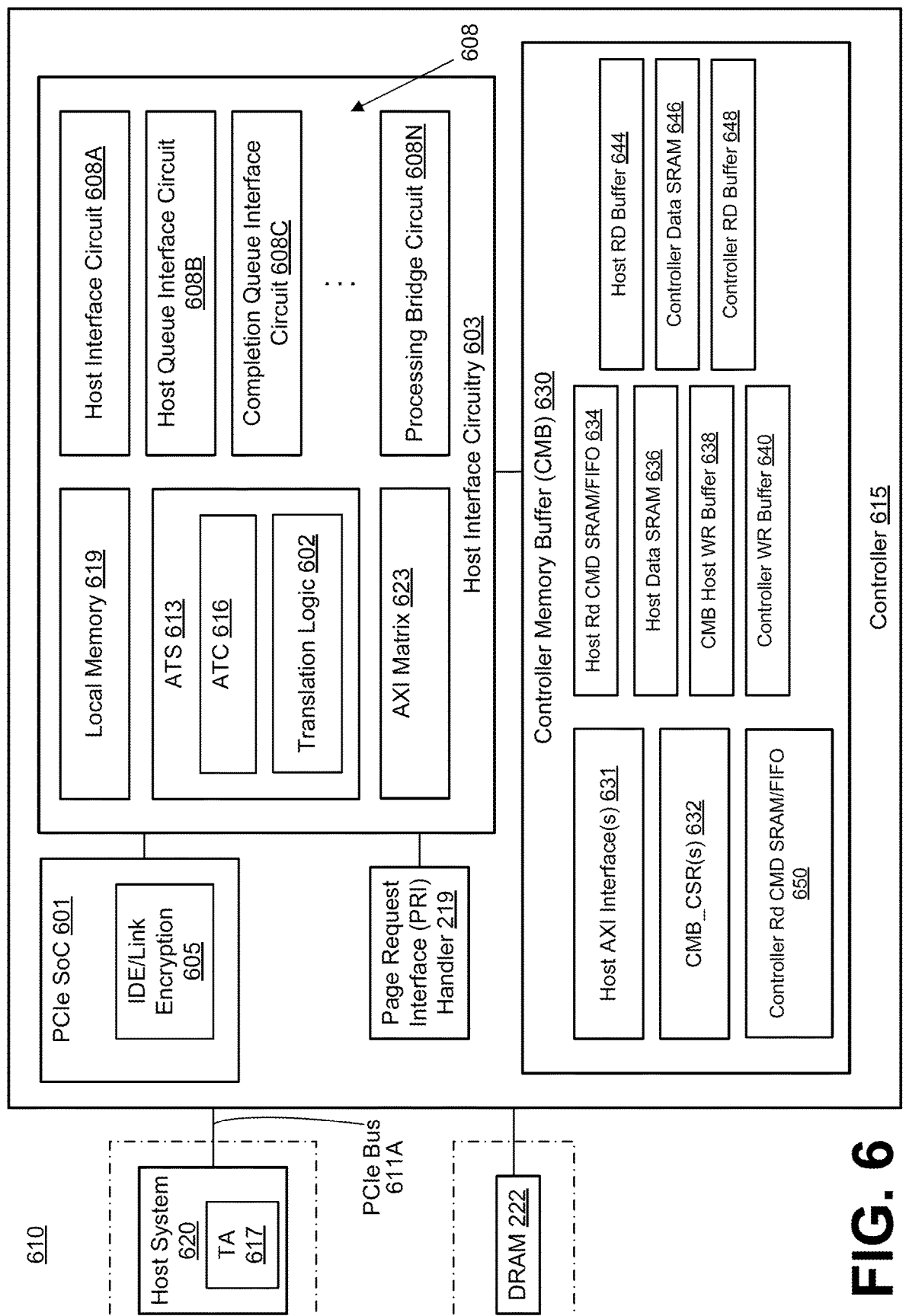
FIG. 6 is a memory sub-system for page request interface support in caching host memory address translation data for multiple host interface circuits in accordance with some embodiments.

FIG. 6 is a memory sub-system 610 for page request interface support in caching host memory address translation data for multiple host interface circuits in accordance with some embodiments. In various embodiments, the memory sub-system 610 can be the same as the memory sub-system 110 of FIG. 1 or the memory sub-system 210 of FIG. 2 or that of FIG. 5. In these embodiments, the memory sub-system 610 includes a controller 615 having a controller memory buffer (CMB) 630 and the PRI handler 219 (discussed with reference to FIG. 2). In some embodiments, the controller 615 is the controller 115, 215, or 415, the local media controller 135, or a combination thereof (see FIG. 1). In at least one embodiment, the CMB 630 is the CMB 300 discussed with reference to FIG. 3, and thus may also include NVM of the memory device 130.

In various embodiments, the CMB 630 includes host Advanced extensible Interface (AXI) interfaces 631, CMB control/status register(s) 632, host read command SRAM/FIFO 634, host data SRAM 636, CMB host write buffer 638, controller write buffer 640, host read buffer 644, controller data SRAM 646, controller read buffer 648, and a controller read command SRAM/FIFO 650 which support the functionality of the controller 615, wherein FIFO stands for first-in-first-out buffer.

In some embodiments, the controller 615 includes a PCIe system-on-a-chip (SoC) 601 and host interface circuitry 603. The PCIe SoC 601 may include PCIe IP that facilitates communication by the host interface circuitry 603 with the host system 620 (including a TA 617) using PCIe protocols. Thus, the PCIe SoC 601 may include capability and control registers present for each physical function and each virtual function of the memory sub-system 610. The PCIe SoC 601 may include integrated development environment (IDE) link encryption circuit 605, which encrypts translation layer packets (TLPs) passed over a PCIe bus 611A to a host system 620 and to decrypt TLPs received from the host system 620.

In various embodiments, the host interface circuitry 612 includes the local memory 619 (SRAM, TCM, and the like), a number of host interface circuits 608A, 608B, 608C, . . . 608N (or together host interface circuits 608), an address translation circuit 613 (or ATS) that includes an ATC 616 and translation logic 602, and an AXI matrix 623 employable to send interrupts to a host system 620 in interaction with reference to handling memory commands and DMAs. The host interface circuits 608A-608N, also referred to herein as HIF circuits 608, include hardware components that help to fetch and process commands (for host queues) and data (for DMAs) to perform a particular function in command and DMA processing. Individual ones of the host interface circuits 608A-608N at times request an address translation of a virtual address or a guest physical address (e.g., associated with a command or DMA). In embodiments, to do so, individual HIF circuits 608 request the address translation circuit 613 to provide the translation. In this way, the address translation circuit 613 interfaces with and supports both address translation generation and invalidation on behalf of the respective host interface circuits 608A-608N, as will be discussed in more detail hereinafter.

Further, in at least one embodiment, the host interface circuit 608N may be a processing bridge circuit 608N that provides a hardware interface between the PRI handler 219 and the other host interface circuits 608A, 608B, 608C, etc. The processing bridge circuit 608N may include various buffers and logic for processing page miss requests, page request responses, and other commands and messages that will be discussed in more detail with reference to FIG. 10. Additionally, in at least one embodiment, the host interface circuit 608B is a host queue interface circuit 608B that handles host command fetch automation (e.g., on submission queue 306 of the host system 120). The host queue interface circuit 608B will be discussed in more detail with reference to FIG. 9 and FIG. 12. Further, in some embodiments, the host interface circuit 608C is a completion queue interface circuit 608C that handles command completion automation (e.g., completion queue 308 posting) to indicate to the host system 120 when the controller 115 has completed processing particular commands. The completion queue interface circuit 608C will be discussed in more detail with reference to FIGS. 13-14.

The address translation circuit 613 can employ many fields and parameters, such as a smallest translation unit (STU) of data (defined by a particular size typically smaller than a host tag) and an invalidation queue depth, beyond which queue entries are purged. The translation logic 602 may use PCIe memory read TLPs to request a translation for a given untranslated address from the TA 617 (or IOMMU). These address translation requests may carry separate PCIe tags and identifiers, for example. The PCIe tags may include, for example "PCIe Memory read completion," indicating the translated address and the size of translation, "S" bit informing the size of translation (e.g., a translated address may represent contiguous physical address space of 128 KB size or similar size), "R" and "W" bits provide Read/write permissions to a page in physical address space, and "U" bit tells the device to do DMA using the untranslated address only. The U bit may be helpful when buffers are one-time use and TA 617 does not have to send invalidations to the controller 615.

In embodiments, when a translation changes in the TA 617, the ATC 616 (one or more caches) in the memory sub-system 610 should purge the old entries corresponding to a virtual address that has been invalidated. Invalidation requests may be sent by the TA 617 to the address translation circuit 613 using PCIe message TLPs, which may be directed at an HIF circuit that is handling some function of memory command processing. The address translation circuit 613 can direct the HIF circuits to purge all DMA for an address range that is being invalidated, remove such entries from the ATC 616, and upon confirmation from the HIF circuits of invalidation, send an invalidation completion (e.g., another PCIe Message TLP) to the host system 620.

In some embodiments, the address translation circuit 613 stores, in the ATC 616, an address translation that returns from the TA 617 in response to an address translation request. In various embodiments, this address translation may include an I/O submission queue (SQ) base address, PRP/SGLs of outstanding commands in one or more HIF circuits, and/or I/O completion queue (CQ) base address. The ATC 616 can be configured to handle finding an empty slot in the ATC 616 and storing a new translation in the empty slot, looking up when data TLPs show up, and purging entries during function level reset (FLR), invalidations, and other resets. The ATC 616 can further be configured to age-out older entries to make space when the cache is running full.

In various embodiments, a queue portion 416A of the ATC 616 cache can be sized to include at least one or two entries per queue of the SQs 442, CQs 444, I/O queues 446, and admin queues 448, although more are envisioned as cache memory device sizes and costs decrease. With sufficient space for two entries, the ATC 616 can store the address translation of a current page associated with a queue as well as a next page (e.g., that sequentially follows the virtual address of the current page). This look-ahead buffering in the ATC 616 of address translations for a predetermined number of queues enables greatly reducing the number of misses at the ATC while keeping a size of the ATC reasonable given the expense of cache memory. Further, a DMA portion 416B of the ATC 616 (for storing data for DMAs) could be expanded for some integral multiple (e.g., 2-4 times) the size of the queue portion of the ATC 616.

In at least some embodiments, the translation logic assigns a queue identifier to each queue of the SQs 442, CQs 444, I/O queues 446, and admin queues 448 ("the queues"). This could be as simple as sequentially incrementing a count number for each subsequent sequentially-ordered queue of a set of queues. The translation logic 602 may then index the queue portion 416A of the ATC 616 cache according to the queue identifier of the respective address translation stored therein and internally (within the address translation circuit 613) track address translation requests and responses using such queue identifiers. Further, the translation logic 602 may index the DMA portion 416B of the cache according to host tag value and internally track DMA-related address translations requests and responses using hot tag values.

In these embodiments, each DMA command has a host tag ("htag") with a virtual address. The translation logic 602 may be configured to store in the ATC 616 one translation per htag for data if the data is more than or equal to a pre-configured size of data. The translation logic 602 may further be configured to store in the ATC 616 one translation per htag for metadata (with no size limit dictating whether to cache). During further operation of the controller 615, the address translation is used as long as subsequent TUs (within the htag) use the same translated physical address range. The cached translation gets replaced when the DMA command starts transferring to or from a different memory range. The cached address translation also gets replaced when the htag gets assigned to a different command, e.g., that uses a different memory location.

Figure 7:
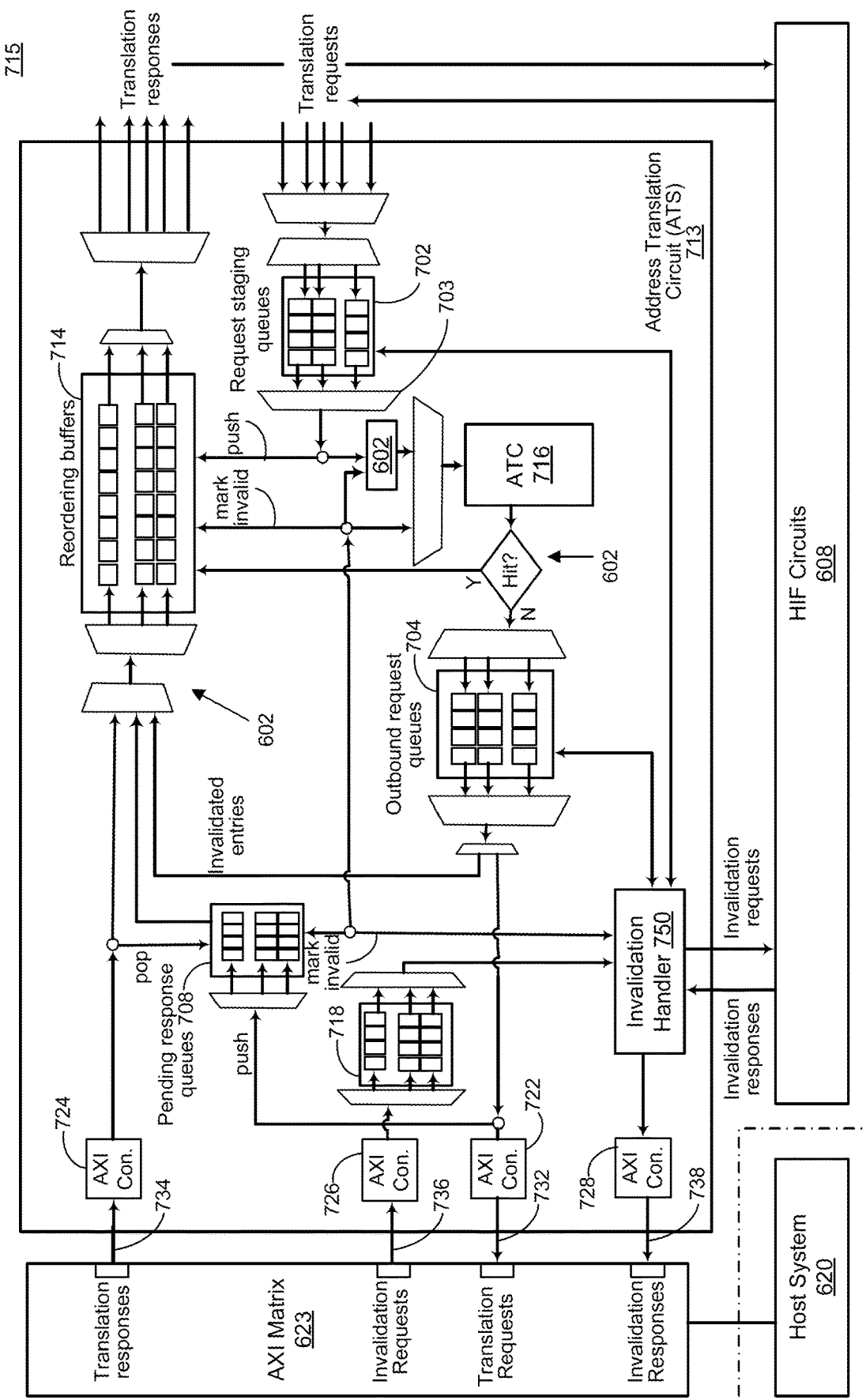
FIG. 7 is an example memory sub-system controller including an address translation circuit implementing caching host memory address translation data in accordance with some embodiments.

FIG. 7 is an example memory sub-system controller 715 including an address translation circuit 713 (or ATS) implementing caching host memory address translation data in accordance with some embodiments. The address translation circuit 713 may be a more detailed instantiation of the address translation circuit 113, 213, 413, and/or 613 discussed with reference to FIG. 1, FIG. 2, FIG. 4, and FIG. 6, respectively.

In various embodiments, the address translation circuit 713 includes a pipeline of queues, buffers, and multiplexers that facilitate the flow of address translation requests and responses and that interfaces with an address translation cache (ATC) 716, similarly as introduced and discussed previously. The multiplexers are generally included within the translation logic 602 and are therefore not always individually numbered or discussed separately from the translation logic 602.

In embodiments, this pipeline begins with address translation requests flowing into a set of request staging queues 702 from host interface (HIF) circuits 608 (see FIG. 6). These address translation requests are often received as a series of address translation requests from any given HIF circuit 608, thus each queue in the set of request staging queues 702 includes multiple available entries for multiple virtual addresses associated with an incoming series of address translation requests, which can be received as a group for example from a given HIF circuit 608. The set of request staging queues 702 buffer the address translation requests, each including a virtual address, which are received from a host interface circuit. A multiplexer 703 then pushes each address translation request into both a set of reordering buffers 714 and to the translation logic 602 that was initially discussed with reference to FIG. 6. Within the set of reordering buffers 714, the address translation requests will provide initial entries that will later be completed with address translations, which will be provided in response to corresponding requesting HIF circuits 608. In embodiments, the translation logic 602 is configured to store incoming address translations, e.g., from the set of reordering buffers 714, into the ATC 716.

In embodiments, the translation logic 602 is coupled to the set of request staging queues 702, the set of reordering buffers 714, and the ATC 716, among other components. The translation logic 602 can determine a queue identifier for respective queues of multiple submission queues (SQs) and multiple completion queues (CQs) discussed previously and identify the queue identifier for respective address translation requests. The translation logic 602 can further index the queue portion 416A of the cache according to the queue identifier of the respective address translations requests.

In at least some embodiments, the translation logic 602 is configured to, for each address translation request in the set of request staging queues, store, in the ATC 716, a first address translation corresponding to a current page associated with the address translation request and store, in the ATC 716, a second address translation corresponding to a subsequent page that sequentially follows the current page according to virtual address numbering. This look-ahead buffering in the ATC 716 of address translations for a predetermined number of queues enables greatly reducing the number of misses at the ATC 716 while keeping a size of the ATC reasonable given the expense of cache memory. As cost of cache memory decreases, it is envisioned that one or more additional address translations that sequentially follow the first address translation (according to virtual addresses) can also be stored in the ATC 716.

In some embodiments, for incoming DMA requests, the translation logic 602 can identify a first host tag, within at least some of the address translation requests, associated with data for DMA. The translation logic can further identify a second host tag, within the at least some of the address translation requests, associated with metadata of the data. The translation logic can then index the DMA portion 416B of the cache according to host tag value, to include values corresponding to each first host tag and each second host tag. In embodiments, in response to a translation unit (TU) of a subsequent address translation request being within a translated memory range as a cached host tag, the translation logic uses an address translation of the cached host tag in the ATC 716 to satisfy the subsequent address translation request. Further, in response to the subsequent address translation request targeting a different memory range than the translated memory range, the translation logic can evict the address translation from the ATC 716. In response to the cached host tag being assigned to a different command, the translation logic 602 can also evict the address translation from the cache (ATC 716).

In some embodiments, the translation logic 602 further, for each incoming address translation request, determines whether the virtual address (or queue identifier) within the address translation request hits or misses at the cache (ATC 716). If the virtual address has a hit within the cache, the translation logic 602 may reinsert a corresponding address translation (including the mapped physical address) into the reordering buffers 714 to be provided out to the requesting HIF circuit 608. Thus, address translations that hit at the ATC 716 can be provided back to the requesting HIF circuit 608 at close to line rate without any further delay in requesting the TA/IOMMU at the host system 620 to perform the translation.

In embodiments, the address translation circuit 713 further includes a set of outbound request queues 704 to buffer one or more of the address translation requests that miss at the cache (the ATC 716), e.g., as an extra pipeline stage for staging these address translation requests to be sent to the host system 620. As these address translation requests are forwarded on to the host system 620, the translation logic 602 pushes each address translation request into a set of pending response queues 708. In embodiments, the set of pending response queues 708 is configured to buffer respective address translation requests that are waiting for an address translation from the host system 620 while maintaining an order as received within the set of request staging queues 702. Maintaining this order within the set of pending response queues 708 helps the set of reordering buffers 714 to properly reorder address translations that come back from the host system 620 (e.g., the TA 617 or IOMMU) despite being pushed out of the set of request staging queues 702 while waiting on the TA 617.

In these embodiments, the address translation requests that missed at the ATC 716 are forwarded to an AXI converter 722, which sends out address translation requests to the host interface 208 over a set of address channels for reads 732 and destined to the TA 617. In this way, the address translation circuit 713 can request a translation agent (such as the TA 617) of the host system to provide physical addresses that map to a first virtual address of the first address translation (for the current page) and to a second virtual address of the second address translation (for the subsequent page that sequentially follows the current page according to virtual address numbering). In response to the TA 617 providing the address translations, the address translations are received over a set of data channels 734 for reads and through an AXI converter 724.

In disclosed embodiments, the translation logic 602 pops the incoming address translations into the set of pending responses queues 708 while also storing the address translations (e.g., the first address translation and the second address translation) in the set of reordering buffers 714. The set of reordering buffers 714 have also received, from the set of pending response queues 708, the proper order of the address translations in relation to the order of receipt of the address translation requests in the set of request staging queues 702. As mentioned, this may include a series of address translation requests from the same HIF circuit 608, and thus the set of reordering buffers 714 can be configured to reorder each pair of address translations for each of these address translation requests to match the order the address translation requests were buffered into the set of pending response queues 708. Thus, the set of reordering buffers 714 can reorder the address translations in this way and provide the first address translation (for each address translation request) to the requesting HIF circuit 608 in the same order as was received with the exception of those that hit at the ATC 716 and have already been supplied to the requesting HIF circuit 608. In these embodiments, the translation logic 602 detects the incoming address translations and copies them from the set of reordering buffers into the ATC 716, which can be accessed later for matches with subsequent address translation requests.

In some embodiments, a translation completion response may come back as a "miss" from the host system 620 because the page corresponding to the virtual address has been unmapped. The translation logic 602 can then reply to the requesting HIF circuit 608 that the virtual address of a particular address translation requested missed. In response to receiving a TLP of such a miss, the HIF circuit 608 may be triggered to generate a page request interface (PRI) message to the host system 620 to remap the virtual address to a physical page having a physical address.

In at least some embodiments, the address translation circuit 713 further includes a set of invalidation queues 718 to buffer invalidation requests received from a translation agent of the host system. More specifically, the invalidation requests may be received over a set of data channels for writes 736 into an AXI converter 726 that receives the invalidation requests from the host system 620. The translation logic 602 can then place each incoming invalidation request into the set of invalidation queues 718 to be handled in an order received.

In these embodiments, the address translation circuit 713 further includes invalidation handler logic 750 coupled to the set of invalidation queues 718, to the host interface circuits 608, to the set of request staging queues 702, to the set of pending response queues 708, and to the set of reordering buffers 714. In embodiments, the invalidation handler logic 750 detects an invalidation request within the set of invalidation queue 718, the invalidation request corresponding to a virtual address of the virtual addresses. The invalidation handler logic 750 can further cause address translations associated with the virtual address to be marked as invalid within the set of request staging queues 702, the set of pending response queues 704, the set of reordering buffers 714, and the cache (the ATC 716). In embodiments, the set of outbound request queues 704 triggers (e.g., via the translation logic 602) the set of reordering buffers 714 to mark an entry therein as invalid in response to an invalidation signal received from the invalidation handler logic 750. The invalidation handler logic 750 can further send associated invalidation requests to the respective host interface circuits 608, which also would be expected to purge invalid entries.

In some embodiments, the address translation circuit 713 (e.g., the corresponding queues and buffers) remove address translations marked as invalid within the set of request staging queues 702, the set of pending response queues 704, the set of reordering buffers 714, and the cache (ATC 716). Each HIF circuit 608 can send an invalidation complete message to the address translation circuit 713, to which the invalidation handler logic 750 and reply with an acknowledgement (ACK). In this way, invalidation handler logic 750 can confirm removal of the address translations by the host interface circuits 608 followed by sending an invalidation completion response to the translation agent (TA 617). The ACK responses may be used by individual HIF circuits 608 to unfreeze any frozen function arbitration.

More specifically, when the invalidation handler logic 750 has confirmed the address translation circuit 713 and the HIF circuits 608 have purged queue, buffer, and cache entries of invalid address translations associated with an invalidation requests, the invalidation handler logic 750 may send an invalidation response to an AXI converter 728. The AXI converter 728 can place the invalidation response out on a set of data channels for writes 738 to the TA 617 at the host system 620.

FIG. 8 illustrates a flow chart of an example method 800 of caching host memory address translation data in a memory sub-system in accordance with some embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the address translation circuit 113, 213, 413, 613, 713 of FIG. 1, FIG. 2, FIG. 4, FIG. 6, and FIG. 7, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 810, the processing logic buffers, within a set of request staging queues of an address translation circuit, address translation requests received from host interface circuits and each comprising a virtual address.

At operation 820, the processing logic stores, within a set of pending response queues, respective address translation requests that are waiting for an address translation from a host system while maintaining an order as received within the set of request staging queues.

At operation 830, the processing logic reorders, within a set of reordering buffers, address translations according to the order maintained within the set of pending response queues, wherein each address translation comprises a physical address mapped to a respective virtual address.

At operation 840, the processing logic sends, from the reordering buffers, the address translations to a corresponding host interface circuit of the host interface circuits that sent a corresponding address translation request.

At operation 850, the processing logic stores, in a cache coupled with the set of request staging queues and the set of reordering buffers, a plurality of the address translations, associated with the address translations requests, for future access by the host interface circuits. Also, at operation 850, the processing logic can further store a plurality of pointers (e.g., SGS/SGL pointers) for outstanding direct memory address (DMA) command within on or more host interface circuits.

At operation 860, when applicable, the processing logic reinserts, into the set of reordering buffers, a first address translation from the cache for a subsequent request for the first address translation by a host interface circuit.

Figure 9:
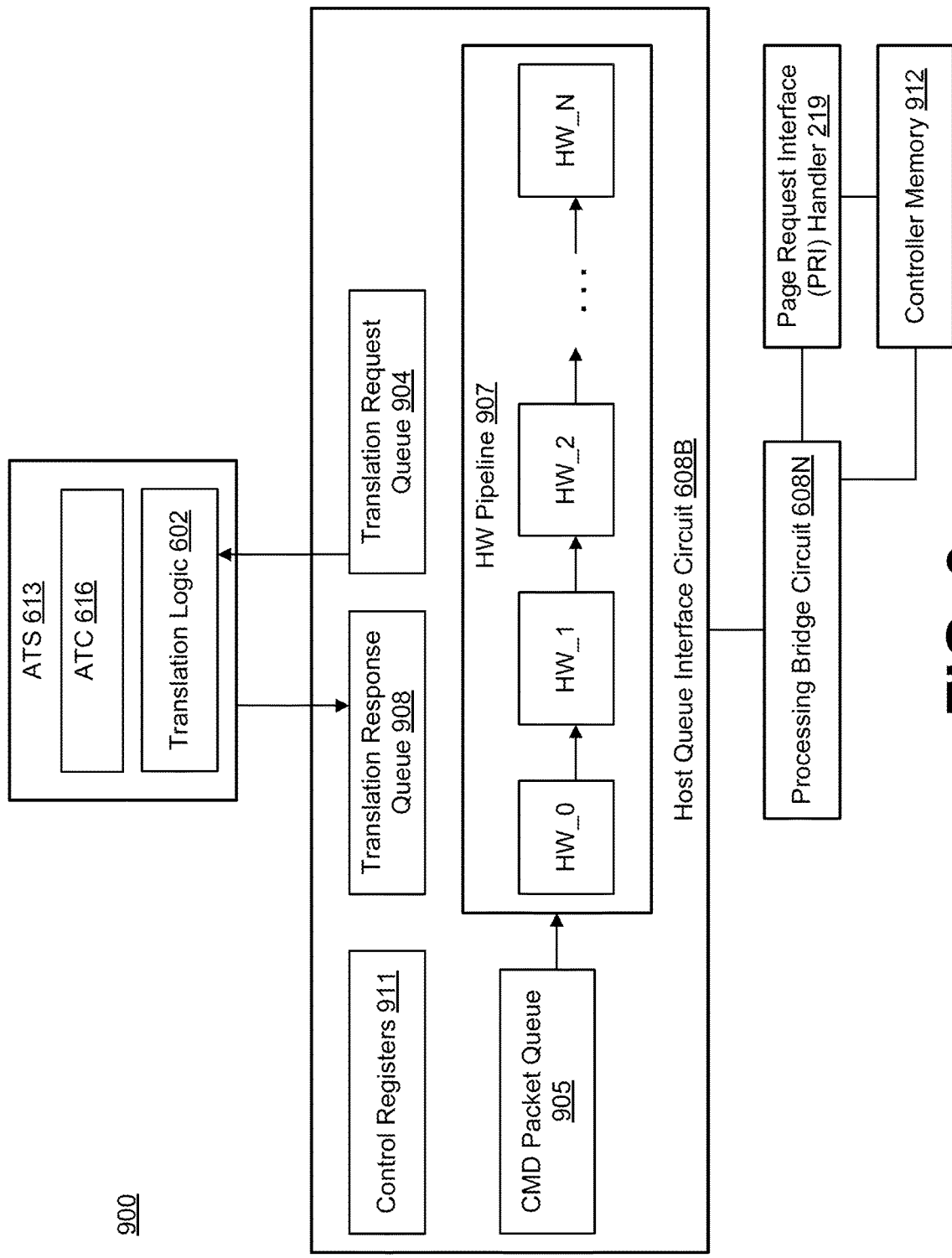
FIG. 9 is a block diagram of a system for host interface circuits, including a host queue interface circuit, interacting with a page request interface handler in accordance with some embodiments.

FIG. 9 is a block diagram of a system 900 for host interface circuits, including the host queue interface circuit 608B, interacting with the PRI handler 219 in accordance with some embodiments. In some embodiments, the system 900 includes the address translation circuit 613 (see FIG. 6), a host interface circuit 608 (such as any of host interface circuits 608A, 608B, 608C, . . . 608N discussed with reference to FIG. 6), the processing bridge circuit 608N (see FIG. 10), the PRI handler 219, and a controller memory 912. In embodiments, the host interface circuit 608 is the host queue interface circuit 608B, which is configured to fetch commands generated by the host system that are stored in one or more submission queues 306 for handling by the controller 215 or 615, as discussed in more detail with reference to FIG. 3.

In various embodiments, a host memory manager (such as the TA 617) swaps out a page of the host memory 212 for a variety of reasons, which can be done without informing user processes or any of the virtual machines VM(0)-VM(n). As was discussed, a device, including the controller 615 that employs the address translation circuit 613, cannot assume that the page that is needed to DMA is present. Accordingly, a page request interface, which will be discussed in more detail with reference to FIG. 10, in conjunction with the PRI handler 219 can provide the ability for the host interface circuitry 603 to cause the translation agent 617 (e.g., the host memory manager) to re-pin a page of memory, return a confirmation that the page has been re-pinned, and provide the corresponding address translation.

In these embodiments, the host queue interface circuit 608B includes a translation request queue 904, a translation response queue 908, a hardware pipeline 907 having a number of hardware stages (HW_0 . . . HW_N), a command packet queue 905 that buffers incoming command packets to be processed by the hardware pipeline 907, and a set of control registers 911. The set of control registers 911 may be present in relation to a physical function (PH) where related or other virtual functions (VFs) may use this set of controller registers 911 as well. Values within the set of controller registers 911 may define an allocation for each PF, how many PRI-related requests can be outstanding for a given PF, and other settings or parameters for hardware functionality of the PF.

In at least some embodiments, the host queue interface circuit 608B is configured to pause command fetch arbitration on a submission queue 606 of the host system that is targeted by an address translation request that has missed at the cache, e.g., at the ATC 616. The host queue interface circuit 608B can further trigger the PRI handler 219 to send a page miss request to the translation agent (TA) of the host system, the page miss request including a virtual address of the address translation request. The host queue interface circuit 608B can further receive a restart message from the PRI handler 219 upon the PRI handler receiving a page miss response from the translation agent. The host queue interface circuit 608B can further restart command arbitration on the submission queue that had been paused responsive to the restart message.

In various embodiments, while a command packet is entering or at one of the hardware stages of the hardware pipeline 907, the host queue interface circuit 608B submits a virtual address of the command packet to the translation request queue 904 to request that the address translation circuit 613 provide an address translation required for the hardware pipeline 907 to complete processing the command packet. If the address translation circuit 613 returns an address translation that was previously stored in the ATC 616, e.g., via the translation response queue 908, the host queue interface circuit 608B proceeds normally with no pause in processing the command packet.

In at least some embodiments, the host queue interface circuit 608B receives a message from the address translation circuit 613, e.g., via the translation response queue 908, that the address translation request has missed at the cache or ATC 616, and thus is a host interface circuit 608 affected by the miss at the cache. In these embodiments, the translation miss message includes the virtual address and a queue number associated with the submission queue of the host system that contains a command for which the address translation request was sent.

In embodiments, this translation miss message triggers the host queue interface circuit 608B, e.g., by referencing values within the set of control registers 911, to remove the command packet from the hardware pipeline 907, in addition to pausing command fetch arbitration on the submission queue 606. The command packet can be associated with a memory read operation that relies on the address translation corresponding to the address translation request that was missed at the cache. The host interface circuit can further send a translation miss message to the PRI handler 219 (e.g., via the controller memory 912), the translation miss message including the virtual address that was in the original address translation request and the queue number associated with the submission queue. For example, the queue number may be a slot in the SQ 306. This translation miss message may be queued within controller memory 912 before arriving at the PRI handler 219, as will be discussed with reference to FIG. 10.

In various embodiments, the translation miss message includes information that identifies where and/or how to reintroduce the command packet into the hardware pipeline. For example, in hardware stage HW_2 triggered the address translation request, and the command packet was removed at this third hardware stage of the hardware pipeline 907, the information included in the translation miss message to the PRI handler 219 can be an identifier of this third hardware stage (HW_2). In embodiments, the set of controller registers 911 stores hardware stage identifiers that are mapped to the respective hardware stages of the hardware pipeline 907. In response to a restart message received for the PRI handler 219 corresponding to the translation miss message that was previously sent to the PRI handler 219, the host interface circuit 608 can reintroduce a command packet into the hardware pipeline 907 where the command packet had been originally removed. In this way, DMAs can proceed (even if slightly delayed during PRI-related processing) and the host interface circuitry is made to more efficiently continue to process commands and other actions in interacting with the host memory 212.

In additional embodiments, the PRI handler 219 is coupled to or included within the host queue interface circuit 608B. In these embodiments, the PRI handler 219 is configured to, responsive to receiving the translation miss message, send the page miss request to the translation agent (TA) of the host system, the page miss request including the virtual address and the queue number of the SQ 306. The PRI handler 219 can be further configured to, responsive to receiving the page miss response, send the restart message to the host queue interface circuit 608B, where the restart message also contains the queue number associated with the submission queue of the host system.

Figure 10:
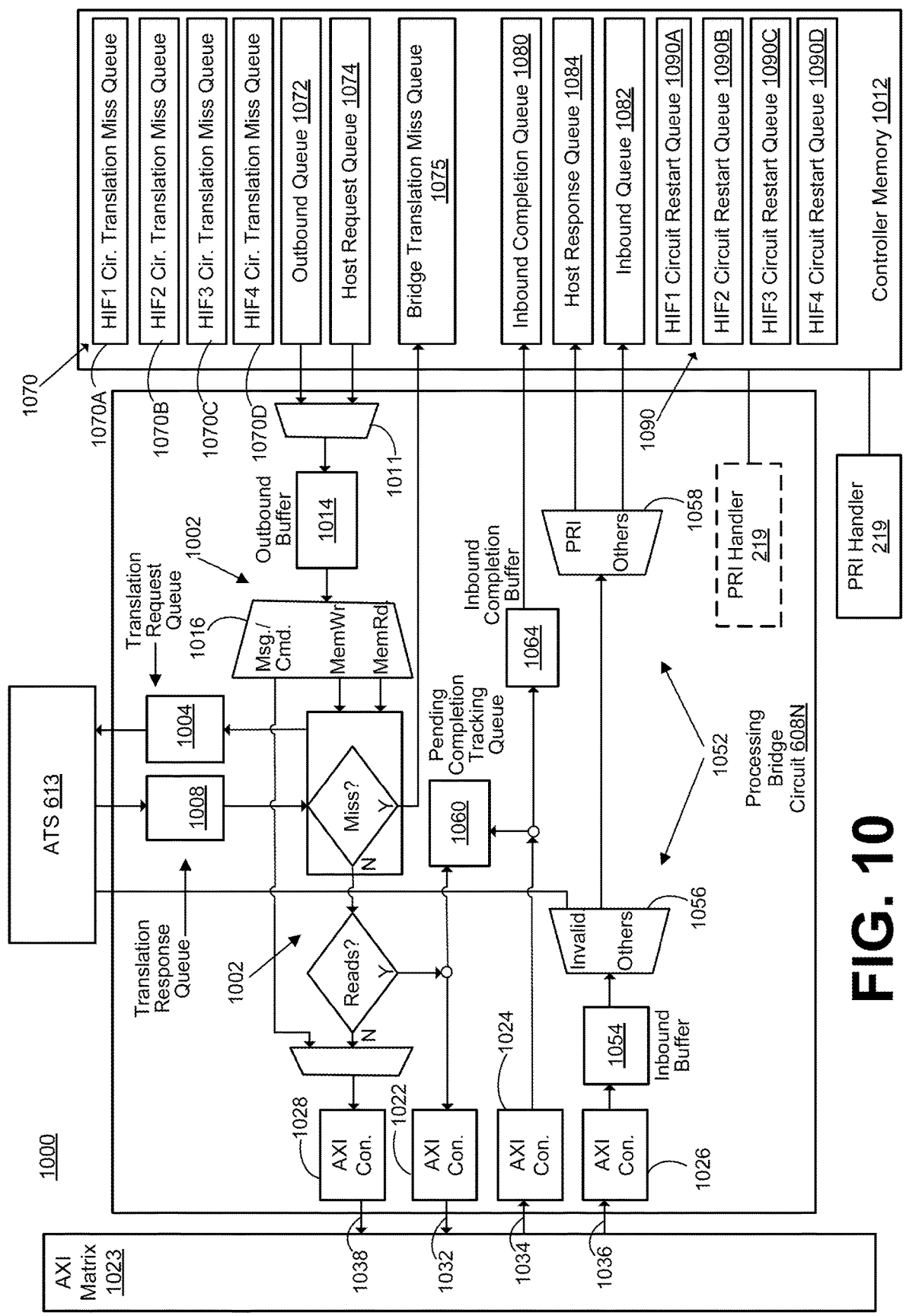
FIG. 10 is a schematic block diagram of a system including a processing bridge circuit implementing page request interface support in caching host memory address translation data in a memory sub-system in accordance with some embodiments.

FIG. 10 is a schematic block diagram of a system 1000 (e.g., a processing bridge system) including the processing bridge circuit 608N implementing page request interface support in caching host memory address translation data in a memory sub-system in accordance with some embodiments. In these embodiments, the system 1000 includes the processing bridge circuit 608N, a number of queues stored in a controller memory 1012 (e.g., of the controller 615), the PRI handler 219, and an AXI matrix 1023. In some embodiments, the controller memory 1012 is DRAM, but can also be SRAM or combination of volatile memory. The controller memory 1012 may be the same as the controller memory 912 (FIG. 9). In these embodiments, the processing bridge circuit 608N is coupled between the controller memory 1012 and the AXI matrix 1023, which provides data and address communication to the host system 620, and also has access to the address translation circuit 613 previously discussed herein. Reference to the host system 620 may be understood to include reference to any other host system herein, including the host system 220 of FIG. 2.

In various embodiments, the PRI handler 219 is coupled to the controller memory 1012 and is optionally integrated with the processing bridge circuit 608N. As discussed, the PRI handler 219 may be processing logic that can include hardware (e.g., processing device, circuitry, dedicated logic, programmable logic, microcode, hardware of a device, integrated circuit, etc.), firmware (e.g., instructions run or executed on the processors 217), or a combination thereof. The controller memory 1012 can store a number of different queues to facilitate communication between the PRI handler 219 and the processing bridge circuit 608N.

In embodiments, for example, the controller memory 1012 stores a set of translation miss queues 1070 coupled to respective HIF circuits 608. For example, the host interface circuit 608A can be coupled to a HIF1 circuit translation miss queue 1070A, the host interface circuit 608B can be coupled to a HIF2 circuit translation miss queue 1070B, the host interface circuit 608C can be coupled to a HIF3 circuit translation miss queue 1070C, and a further host interface circuit can be coupled to a HIF4 circuit translation miss queue 1070D, where additional or fewer miss request queues are envisioned. Each queue of the set of translation miss queues 1070 receives page miss messages from respective HIF circuits 608, where each page miss message is indicative of a miss at the address translation cache (ATC) 616 for a host address translation. The controller memory 1012 can further store an outbound queue 1072, a host request queue 1074, and a bridge translation miss queue 1075, which will be discussed in more detail.

In various embodiments, the PRI handler 219 tracks activities associated with each page miss message received at the set of translation miss queues 1070 from respective ones of the host interface circuits 608. In these embodiments, the PRI handler 219 tracks translation miss messages received from the host interface circuits 608, each translation miss message including a virtual address of a miss at the cache (or ATC 616). The PRI handler 219 further removes duplicate translation miss messages having an identical virtual address, e.g., so as not to send multiple duplicate page miss requests to the host system 620 unnecessarily. The PRI handler 219 further creates a set of page miss requests from non-duplicate translation miss messages that are categorized into page request groups. Thus, the page miss requests are associated with page miss messages received from a respective host interface circuit. The PRI handler 219 further queues the page request groups to be sent to a translation agent of the host system, e.g., within the host request queue 1074.

In these embodiments, each page request group, for example, corresponds to a host interface circuit of the host interface circuits 608. Each page miss request causes the translation agent (e.g., TA 617) to re-pin a physical page of memory to the virtual address of a respective page miss request. In at least some embodiments, the page miss requests are PCIe message TLPs that contain a virtual address of the page and optionally a process address space identifier (PASID). The PASID may be included when the host system 620 is executing processes (such as the virtual machines VM(0)-VM(n)) that share the controller 615 or memory devices controlled by the controller 615.

In some embodiments, each page needs its own page miss request, and potentially, there can be several thousand page miss requests for a big I/O load, such as may be required for interacting with a NIC. Each page miss request may invoke page handler software at the host system 620 that does batch processing of multiple page requests. For simplicity of illustration, the TA 617 (which can be an IOMMU) may be understood to include such page handler software. In embodiments, sending the same page address in multiple page miss requests may not trigger an error, although doing so may burn host CPU cycles.

In these embodiments, the PRI handler 219 further categorizes the page miss requests into the page request groups, e.g., according to an incoming queue of the set of translation miss queues 1070 or another identifier such as a hardware identifier of a source of the page miss requests. The PRI handler 219 can further restrict the page miss requests that are outstanding for a particular host interface circuit 608 to a threshold number of page miss requests. This may be permed in firmware or as a practical limitation based on an allocation of the controller memory 1012 to a respective translation miss queue assigned to the particular host interface circuit 608.

In various embodiments, the outbound queue 1072 may buffer memory commands (e.g., host memory read or host memory write) directed to the host memory 212 of the host system 620 and other messages directed to the host system 620. The processing bridge circuit 608N may include a multiplexer 1011 that variably transfers page miss requests from the host request queue 1074 (e.g., a page response group) and one or more or memory commands or other messages from the outbound queue 1072 into an outbound buffer 1014 of the processing bridge circuit 608N. The outbound buffer 1014 is thus coupled to the controller memory 1012 and configured to buffer page request groups and the memory commands. In some embodiments, the multiplexer 1011 is a part of outbound queue handler logic 1002 of the processing bridge circuit 608N that decodes packets from the outbound queue 1072 and the host request queue 1074.

In embodiments, the queue handling logic 1002 further includes a multiplexer 1016 that determines what content the outbound buffer 1014 contains and directs that content to the correct destination within the processing bridge circuit 608N. For example, if the outbound buffer 1014 contains a first page request group, the multiplexer 1016 causes the page miss requests of the first page request group to be sent to a translation agent (e.g., TA 617) of the host system 620, which causes the translation agent to re-pin a physical page of memory to each respective virtual address of respective page miss requests.

If, however, the queue handling logic 1002 determines the outbound buffer 1014 contains a memory command (such as a read or write directed at the host memory 212), the multiplexer 1016 directs the memory command into additional outbound queue handling logic 1002. In various embodiments, the queue handling logic 1002 requests, from the address translation circuit 613 (or ATS), an address translation for a virtual address of the memory command. In response to receiving the address translation from the address translation circuit 613, the queue handling logic 1002 sends the memory command with the address translation to the host system 620, as normal. In response to receiving a miss response from the address translation circuit 613, however, the queue handling logic 1002 discards the memory command and submits a page miss message to the bridge translation miss queue 1075. The PRI handler 219 may then process this page miss message along with page miss messages received through the set of translation miss queues 1070, and submit a corresponding page miss request (or page request group) into the host request queue 1074 for the translation miss. Once an address translation comes back with a page request response from the TA 617, e.g., via an inbound buffer 1054 (which will be discussed in more depth), the PRI handler 219 can resubmit the command packet (now including an address translation for the virtual address) to the outbound queue 1072, e.g., an outbound command queue.

In various embodiments, the queue translation logic 1002 buffers read commands into a pending completion tracking queue 1060 that are also sent to the host system 620. The write commands and the page miss requests may be sent to the host system 620 via an AXI converter 1028. The AXI converter 1028 can place the write commands and page miss requests out on a set of data channels for writes 1038 to the TA 617 at the host system 620.

In these embodiments, the read commands may be sent to the host system 620 via an AXI converter 1022, which sends out read commands to the TA 617 of the host system 620 over a set of address channels for reads 1032. Further, in these embodiments, the pending completion tracking queue 1060 tracks incoming data received over a set of data channels for reads 1034 and through an AXI converter 1024 that passes the incoming data for the read commands. In embodiments, the pending completion tracking queue 1060 detects data received for a particular read command that is being tracked and, once the data is complete, sends the data to an inbound completion buffer 1064 of the processing bridge circuit 608N. In at least one embodiment, the inbound completion buffer 1964 receives data of a particular read command from the pending completion tracking queue 1060 and provides the data to an inbound completion queue 1080 stored in the controller memory 1012.

In various embodiments, page request responses being returned from the TA 617 of the host system 620 are received over a set of data channels for writes 1036 into an AXI converter 1026. The AXI converter 1026 passes the page request responses (as well as other memory commands and messages, including invalidation requests) received from the host system 620. The processing bridge circuit 608N further includes an inbound buffer 1054 to receive the page request responses as well as other memory commands and messages from the host system 620. In embodiments, inbound queue handling logic 1052 is coupled between the inbound buffer 1054 and the controller memory 1012.

The inbound queue handling logic 1052 can include a multiplexer 1056 to determine whether the inbound buffer 1054 includes page request responses, memory commands (directed at the controller memory 1012), messages, or invalidation requests. If invalidation requests, the multiplexer 1056 sends the invalidation requests to the address translation circuit 613. The multiplexer 1056 sends messages, memory commands, or page request responses to a second multiplexer 1058 that further directs this content. The multiplexer 1058 may send messages and the memory commands to an inbound queue 1082 and the page request responses to a host response queue 1082 of the memory controller 1012. The host response queue 1084 can buffer the page request responses received from the inbound buffer 1054. The inbound queue 1082 can buffer incoming memory commands and other messages received from the inbound buffer 1054.

In at least some embodiments, the PRI handler 219 receives, via the host response queue 1084, these page request responses corresponding to the page miss requests. In some embodiments, each page request response indicates that the TA 617 has re-pinned a physical page of memory to the virtual address of a respective page miss request. The page request response can further contain an address translation for the virtual address in the original page miss request (or page request group), which can be provided to the address translation circuit 613 to be stored in the ATC 616.

In various embodiments, each page request response can be a TLP message sent by the host system 620 to indicate re-pinning failure or success for a group of pages or for some individual pages. It is not an error for the TA 617 of the host system 620 to make a subset of the pages corresponding to the page miss requests resident instead of all the pages. As a result of functionality of the PRI handler 219 in connection with the processing bridge circuit 608N, the PRI handler 219 may not be allowed to send an "Untranslated Address" message even after a successful page request response.

In disclosed embodiments, the controller memory 1012 includes a set of restart queues 1090 that buffer restart messages from the PRI controller 219 corresponding to the page request responses buffered in the host response queue 1084. In embodiments, each restart queue 1090 is coupled to a respective host interface circuit 608 to provide corresponding restart messages to the respective host interface circuits 608. More specifically, the host interface circuit 608A can be coupled to a HIF1 circuit restart queue 1090A, the host interface circuit 608B can be coupled to a HIF2 circuit restart queue 1090B, the host interface circuit 608C can be coupled to a HIF3 circuit restart queue 1090C, and a further host interface circuit can be coupled to a HIF4 circuit restart queue 1090D. Each restart message placed by the PRI handler 219 in one of the set of restart queues 1090 can be provided out of the controller memory 1012 to a corresponding host interface circuit 608. As discussed with reference to FIG. 9, a restart message causes the host interface circuit 608 to reinsert the command packet into the hardware pipeline 907 where the command packet had originally been removed.

FIG. 11 is a flow chart of an example method 1100 of page request interface support in caching host memory address translation data in a memory sub-system in accordance with some embodiments. The method 1100 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1100 is performed by the PRI handler 219 of FIG. 2, FIG. 6, and FIG. 9. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1110, the processing logic stores, in a cache, multiple address translations associated with address translation requests from a host interface circuit. Each address translation request includes a virtual address needing translation.

At operation 1120, the processing logic tracks translation miss messages received from the host interface circuits, each translation miss message comprising the virtual address of a miss at the cache.

At operation 1130, the processing logic removes duplicate translation miss messages having an identical virtual address.

At operation 1140, the processing logic creates multiple page miss requests from non-duplicate translation miss messages that are categorized into page request groups, each page request group corresponding to a host interface circuit of the plurality of host interface circuits.

At operation 1150, the processing logic queues the page request groups to be sent to a translation agent of a host system. In embodiments, the processing bridge circuit 608N then sends the queued page request groups to the host system for handling.

FIG. 12 is a flow chart of an example method 1200 of page request interface support in handling host submission queues in caching host memory address translation data in a memory sub-system in accordance with some embodiments. The method 1200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1200 is performed by the host queue interface circuit 608B of FIG. 6 and FIG. 9. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1210, the processing logic stores, in a cache (e.g., ATC), address translations with address translation requests from a host queue interface circuit, each address translation including a virtual address.

At operation 1220, the processing logic pauses command fetch arbitration on a submission queue of the host system that is targeted by an address translation request that has missed at the cache.

At operation 1230, the processing logic triggers a page request interface (PRI) handler to send a page miss request to a translation agent of the host system, the page miss request including a virtual address of the address translation request. In embodiments, the PRI handler is the PRI handler 219 discussed throughout this disclosure.

At operation 1240, the processing logic receives a restart message from the PRI handler upon the PRI handler receiving a page miss response from the translation agent.

At operation 1250, the processing logic restarts command arbitration on the submission queue that had been paused responsive to the restart message.

Figure 13:
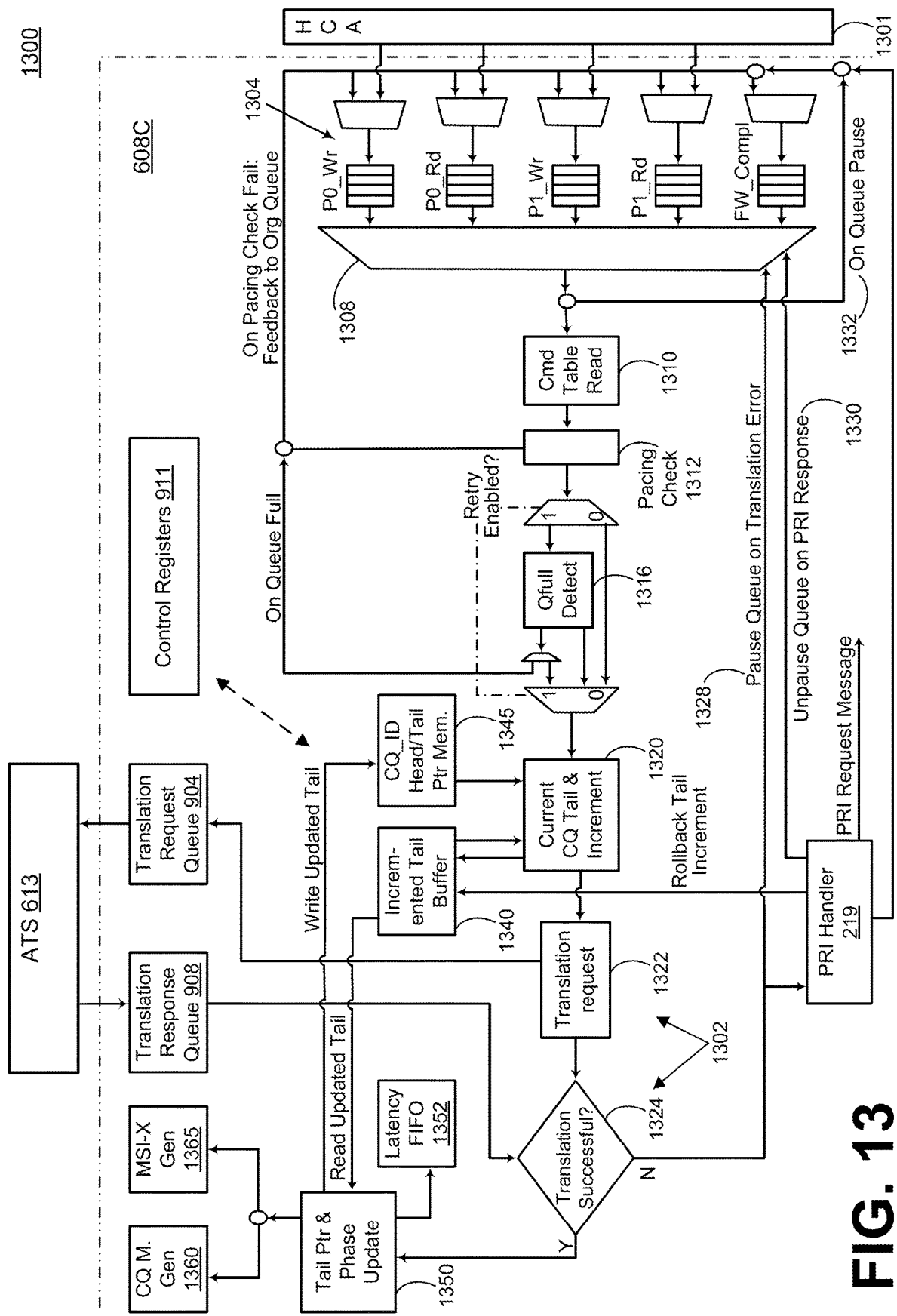
FIG. 13 is a schematic block diagram of a system including a completion queue interface circuit implementing page request interface support in caching host memory address translation data in a memory sub-system in accordance with some embodiments.

FIG. 13 is a schematic block diagram of a system 1300 including a completion queue interface circuit 608C implementing page request interface support in caching host memory address translation data in a memory sub-system in accordance with some embodiments. In various embodiments, the system 1300 includes the ATS 613, the completion queue interface circuit 608C, and a host command automation (HCA) circuit 1301. As discussed and illustrated with reference to FIG. 6, the ATS 613 may include the ATC 616 and translation logic 602 for determining address translations for host virtual addresses.

In various embodiments, particularly related to NVMe handling by the host system, a completion queue (CQ) 308 (FIG. 3) is a circular buffer with a fixed slot size used to post status for completed commands. A completed command may be uniquely identified by a combination of the associated SQ identifier and command identifier that is assigned by host software. Multiple submission queues (SQs) may be associated with a single CQ. This feature may be used where a single worker thread processes all command completions via one CQ even when those commands originated from multiple SQs. The CQ head pointer may be updated by host software after it has processed completion entries indicating the last free CQ entry.

In some embodiments, a Phase (P) bit may be defined in the completion entry of the CQ 308 to indicate whether an entry has been newly posted without consulting a register. This enables host software to determine whether the new entry was posted as part of the previous or current round of completion notifications. Specifically, each round through the CQ locations, the controller 215 or 615 inverts the Phase bit.

In at least some embodiments, the completion queue interface circuit 608C is configured to write completion messages (or notifications) to the completion queues (CQ) 308 of the host system upon detecting that the controller 215 or 615 has completed handling of corresponding host commands. For example, the completion queue interface circuit 608C can send these completion messages or notifications to the host system in response to CQ doorbell memory requests, as part of NVMe command completion, e.g., that the controller is done handling a write command or read command. In these embodiments, even though the completion queue interface circuit 608C handles the reporting of command completion, even at this stage, an address translation request can miss at the cache of the ATS 613, e.g., at the ATC 616.

In these embodiments, the HCA circuit 1301 arbitrates the completion of commands and coordinates sending a CQ completion message to the host system. To do so, the HCA circuit 1301 can create an entry that is placed in a completion queue (CQ) 308 of the CMB 300 (see FIG. 3) or host memory 212 (see FIG. 2). The HCA circuit 1301 may generate message-signaled interrupts, e.g., MSI-X in NVMe, to alert the host system to process the entry in the CQ 308.

In various embodiments, the HCA circuit 1301 checks an operations code (opcode) of the incoming memory command to determine whether to use firmware or hardware automation for completion handling. If hardware automation, the HCA circuit 1301 may be configured to directly fetch the command, perform the data transfer associated with the command, and insert command identification metadata associated with the command into one of a set of completion request queues 1304 (individually labeled as P0_Wr, P0_Rd, P1_Wr, P1_Rd) to initiate completion. If, however, the HCA circuit 1301 is to use firmware for handling, the HCA circuit 1301 may trigger the PRI handler 219 to provide (and/or generate) the command identification metadata, which is inserted into a firmware completion request queue (labeled as FW_Compl) of the set of completion request queues 1304 to initiate completion.

In at least some embodiments, the command metadata may include, for example, a command identifier (ID) and host tag (htag). In these embodiments, the host system assigns a specific command identifier (ID) to a command that is buffered in an entry of a submission queue (SQ 306) and may be used to also identify a corresponding entry in the completion queues 308. Further, the HCA circuit 1301 (or other host command circuit that functions similarly) may generate the host tag (or htag) for tracking completion requests within the completion queue interface circuit 308C. For purposes of ease of explanation, the command identification metadata, once queued in the set of completion request queues 1304, will be referred to as a "completion request."

In these embodiments, a multiplexer 1308 selects a completion request to process through the hardware and logic of the completion queue interface circuit 608C. At operation 1310, a command table read is performed to determine one or more parameters associated with the CQ entry (corresponding to the completion request) in order to generate the completion message or notification to the host system. At operation 1312, a pacing check is performed to see if pacing is enabled, e.g., meaning that entries into the CQ 308 are to be paced through the completion queue at a particular rate or in a particular way. Pacing, for example, may be triggered if the CQ 308 is full, which may be detected at operation 1316. If the CQ 308 is full, then the completion request that is within the hardware pipeline may be reinserted back into the original completion request queue where the completion request started. In some embodiments, additional multiplexers may be employed that are triggered by a retry enable signal that is asserted if pacing is enabled.

After any pacing is accounted for, at operation 1320, the completion queue interface circuit 608C can identify the current CQ tail (within the circulate buffer) and increment the position related to the memory command for which completion is being arbitrated. At operation 1322, translation request circuitry 1302 of the completion queue interface circuit 608C issues a translation request, via the translation request queue 904, to the ATS 613. The ATS 613 may provide a response to the translation request via the translation response queue 908. This address translation process is discussed in more detail with reference to FIG. 6.

In various embodiments, the translation request circuitry 1302 may then detect, at operation 1324, an address translation request for a completion request that misses at the cache. The completion request is buffered within a particular completion request queue of the set of completion request queues 1304 and is associated with an entry in a completion queue (CQ 308) of the host system. If, at operation 1328, the translation request misses, at operation 1330, the translation request circuitry 1302 pauses the particular completion request queue in response to the detected miss, e.g., via control of the multiplexer 1308. Further, the translation request circuitry 1302 may further, at operation 1332 in response to the detected miss, reinsert the completion request into the set of completion request queues 1304, similarly as performed if the CQ 308 is full.

In embodiments, the translation request circuitry 1302 also triggers a page request interface (PRI) handler (e.g., the PRI handler 219) to send a page miss request to the translation agent (TA) of the host system. The page miss request includes a virtual address of the address translation request. To trigger the PRI handler 219, the translation request circuitry 1302 may send a translation miss message to the PRI handler 219, the translation miss message including the virtual address and a command identifier associated with the entry in the completion queue. In these embodiments, the translation request circuitry 1302 receives a restart message from the PRI handler 219 upon the PRI handler receiving a page miss response from the translation agent (TA). At operation 1330, the translation request circuitry 1302 may restart the particular completion request queue responsive to the restart message, e.g. via control of the multiplexer 1308.

In some embodiments, the PRI handler 219 is one of coupled to or included within the completion queue interface circuit 608C. The PRI handler 219 may be configured to, responsive to receiving the translation miss message, send the page miss request to the translation agent (TA) of the host system, the page miss request including the virtual address and a command identifier associated with the entry in the completion queue. The PRI handler 219 may further, responsive to receiving the page miss response, send the restart message to the completion queue interface circuit 608C, the restart message containing a host tag associated with the particular completion queue.

In embodiments, the translation request circuitry 1302 detects the completion request that is recirculated from the set of completion request queues and requests the address translation circuit 613 to obtain an address translation from the host system corresponding to the virtual address. The translation request circuitry 1302 may further receive the address translation from the address translation circuit 613 and generate, using the address translation, a completion queue message that is associated with the completion request and that targets the entry in the completion queue, as will be explained in additional detail.

In various embodiments, at operation 1350, the completion queue interface circuit 608C performs a tail pointer and phase update. For example, at operation 1340, the completion queue interface circuit 608C may read the incremented CQ tail buffer that was updated at operation 1320. Further, at operation 1345, the completion queue interface circuit 608C may write an updated tail value using the CQ command ID to a tail pointer memory. The phase bit (discussed previously) may be updated at operation 1350 in order to update the phase. In some embodiments, the completion queue interface circuit 608C may update a latency first-in-first-out (FIFO) buffer 1352 based on tracking this phase information over a series of completion requests. Updating the FIFO buffer 1352 may be performed as assigning each command for which completion is being requested into a time bucket depending on a latency required to complete the command (from command fetch to bell ring on submitting the completion message or notification). In embodiments, the FIFO buffer 1352, tail pointer buffer and/or memory, and associated pointers, may be stored in or associated with local memory and/or registers, generally represented as the control registers 911 (see also FIG. 9).

In these embodiments, at operation 1360, the completion queue interface circuit 608C generates the completion queue message that is written into the completion queue (CQ 308). For example, the completion queue interface circuit 608C may determine a submission queue identifier that identifies the corresponding entry of the submission queue for the command and generate a completion queue message for the completion request that includes the command identifier, the submission queue identifier, and the host tag. Further, at operation 1365, the completion queue interface circuit 608C generates an MSI-X (or similar MSI-related) message to alert the host system to process the entry in the CQ 308.

FIG. 14 is a flow chart of an example method 1400 of page request interface support in handling completion automation in caching host memory address translation data in a memory sub-system in accordance with some embodiments. The method 1400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1400 is performed by the completion queue interface circuit 608C of FIG. 6 and FIG. 13. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1410, the processing logic detects an address translation request for a completion request that misses at the cache, the completion request being buffered within a particular completion request queue of the set of completion request queues and associated with an entry in a completion queue of the host system.

At operation 1420, the processing logic pauses the particular completion request queue in response to the detected miss.

AT operation 1430, the processing logic triggers a page request interface (PRI) handler to send a page miss request to a translation agent of the host system, the page miss request including a virtual address of the address translation request.

At operation 1440, the processing logic receives a restart message from the PRI handler upon the PRI handler receiving a page miss response from the translation agent.

At operation 1450, the processing logic restarts the particular completion request queue responsive to the restart message.

Figure 15:
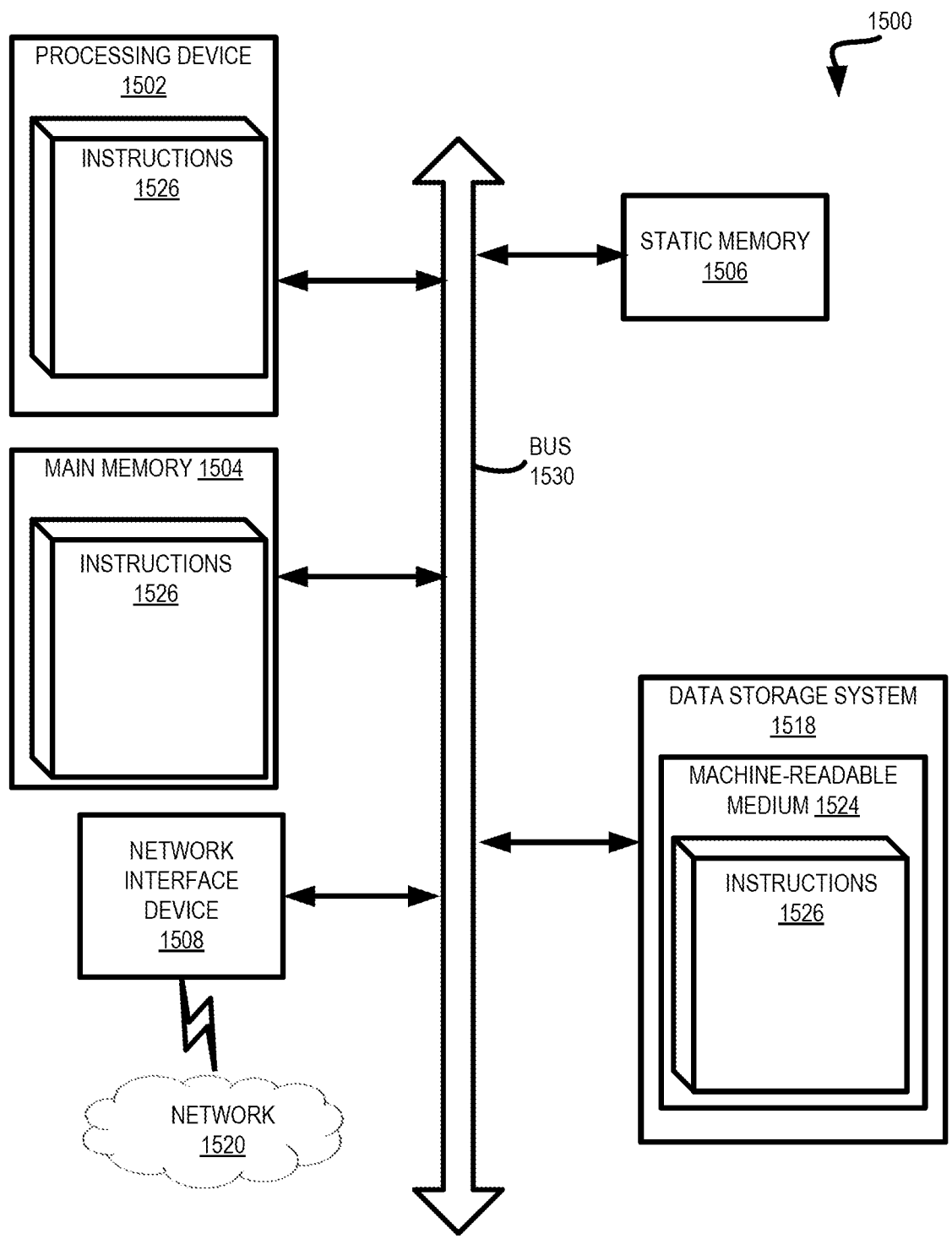
FIG. 15 is a block diagram of an example computer system in which embodiments of the present disclosure can operate.

FIG. 15 illustrates an example machine of a computer system 1500 within which a set of instructions, for causing the machine to perform any one or more of the methodologies discussed herein, can be executed. In some embodiments, the computer system 1500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute instructions or firmware of the controller 115). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1500 includes a processing device 1502, a main memory 1504 (e.g., read-only memory (ROM), flash memory, dynamic random access memory (DRAM) such as synchronous DRAM (SDRAM) or Rambus DRAM (RDRAM), etc.), a static memory 1506 (e.g., flash memory, static random access memory (SRAM), etc.), and a data storage system 1518, which communicate with each other via a bus 1530.

Processing device 1502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1502 can also be one or more special-purpose processing devices such as an application specific integrated circuit (ASIC), a field programmable gate array (FPGA), a digital signal processor (DSP), network processor, or the like. The processing device 1502 is configured to execute instructions 1526 for performing the operations and steps discussed herein. The computer system 1500 can further include a network interface device 1508 to communicate over the network 1520.

The data storage system 1518 can include a machine-readable storage medium 1524 (also known as a computer-readable medium) on which is stored one or more sets of instructions 1526 or software embodying any one or more of the methodologies or functions described herein. The instructions 1526 can also reside, completely or at least partially, within the main memory 1504 and/or within the processing device 1502 during execution thereof by the computer system 1500, the main memory 1504 and the processing device 1502 also constituting machine-readable storage media. The machine-readable storage medium 1524, data storage system 1518, and/or main memory 1504 can correspond to the memory sub-system 110 of FIG. 1.

In one embodiment, the instructions 1526 include instructions to implement functionality corresponding to the controller 115 of FIG. 1. While the machine-readable storage medium 1524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory sub-system controller comprising:
   host interface circuitry to interact with a host system and comprising:
   a host queue interface circuit to interact with submission queues of the host system; and
   an address translation circuit, coupled to the host queue interface circuit, the address translation circuit to handle address translation requests to the host system from the host queue interface circuit, the address translation circuit comprising a cache to store address translations associated with the address translation requests;
   wherein the host queue interface circuit is to:

pause command fetch arbitration on a submission queue of the host system that is targeted by an address translation request that has missed at the cache;

trigger a page request interface (PRI) handler to send a page miss request to a translation agent of the host system, the page miss request including a virtual address of the address translation request;

receive a restart message from the PRI handler upon the PRI handler receiving a page miss response from the translation agent; and restart command arbitration on the submission queue that had been paused responsive to the restart message.

2. The memory sub-system controller of claim 1, wherein the page miss request is to cause the translation agent to re-pin a physical page of memory to the virtual address, and wherein the page miss response is indicative that the physical page has been re-pinned.

3. The memory sub-system controller of claim 1, wherein to trigger the PRI handler, the host queue interface circuit is to send a translation miss message to the PRI handler, the translation miss message comprising the virtual address and a queue number associated with the submission queue of the host system that contains a command for which the address translation request was sent.

4. The memory sub-system controller of claim 3, further comprising the PRI handler one of coupled to or included within the host queue interface circuit, the PRI handler to perform operations comprising:

responsive to receiving the translation miss message, sending the page miss request to the translation agent of the host system, the page miss request including the virtual address and the queue number; and responsive to receiving the page miss response, sending the restart message to the host queue interface circuit, the restart message containing the queue number.

5. The memory sub-system controller of claim 1, wherein the host queue interface circuit is further to:

receive a message from the address translation circuit that the address translation request has missed at the cache;

remove a command packet from a hardware pipeline, the command packet associated with a memory read operation that relies on an address translation corresponding to the address translation request; and send a translation miss message to the PRI handler, the translation miss message comprising the virtual address.

6. The memory sub-system controller of claim 5, wherein the translation miss message further comprises information that identifies how to reintroduce the command packet into the hardware pipeline.

7. A method comprising:

storing, in a cache, address translations associated with address translation requests from a host queue interface circuit, each address translation comprising a virtual address;

pausing, by the host queue interface circuit, command fetch arbitration on a submission queue of a host system that is targeted by an address translation request that has missed at the cache;

triggering a page request interface (PRI) handler to send a page miss request to a translation agent of the host system, the page miss request including a virtual address of the address translation request;

receiving a restart message from the PRI handler upon the PRI handler receiving a page miss response from the translation agent; and restarting, by the host queue interface circuit, command arbitration on the submission queue that had been paused responsive to the restart message.

8. The method of claim 7, wherein the page miss request causes the translation agent to re-pin a physical page of memory to the virtual address, and wherein the page miss response is indicative that the physical page has been re-pinned.

9. The method of claim 7, wherein triggering the PRI handler comprises sending a translation miss message to the PRI handler, the translation miss message comprising the virtual address and a queue number associated with the submission queue of the host system that contains a command for which the address translation request was sent.

10. The method of claim 9, responsive to receiving the translation miss message, the method further comprising:

sending the page miss request to the translation agent of the host system, the page miss request including the virtual address and the queue number; and responsive to receiving the page miss response, sending the restart message to the host queue interface circuit, the restart message containing the queue number.

11. The method of claim 7, wherein an address translation circuit performs the storing to the cache, the method further comprising:

receiving a message from the address translation circuit that the address translation request has missed at the cache;

removing a command packet from a hardware pipeline, the command packet associated with a memory read operation that relies on an address translation corresponding to the address translation request; and sending a translation miss message to the PRI handler, the translation miss message comprising the virtual address.

12. The method of claim 11, wherein the translation miss message further comprises information that identifies how to reintroduce the command packet into the hardware pipeline.

13. A system comprising:

a memory device; and a processing device operatively coupled with the memory device, the processing device comprising:

host interface circuitry to interact with a host system and comprising:

a completion queue interface circuit to interact with a completion queue of the host system, the completion queue interface circuit comprising a set of completion request queues and translation request circuitry; and an address translation circuit, coupled to the completion queue interface circuit, to handle address translation requests to the host system from the completion queue interface circuit, the address translation circuit comprising a cache to store address translations associated with the address translation requests;

wherein the translation request circuitry is to:

detect an address translation request for a completion request that misses at the cache, the completion request being buffered within a particular completion request queue of the set of completion request queues and associated with an entry in the completion queue;

pause the particular completion request queue in response to the detected miss;

trigger a page request interface (PRI) handler to send a page miss request to a translation agent of the host system, the page miss request including a virtual address of the address translation request;

receive a restart message from the PRI handler upon the PRI handler receiving a page miss response from the translation agent; and restart the particular completion request queue responsive to the restart message.

14. The system of claim 13, wherein the translation request circuitry is further to, in response to the detected miss, reinsert the completion request into the set of completion request queues.

15. The system of claim 13, wherein the page miss request is to cause the translation agent to re-pin a physical page of memory to the virtual address, and wherein the page miss response is indicative that the physical page has been re-pinned.

16. The system of claim 13, wherein the completion request comprises:

a command identifier of the host system assigned to a command that is buffered in a corresponding entry of a submission queue; and a host tag generated by a host command circuit, of the host interface circuitry, for tracking completion requests within the completion queue interface circuit.

17. The system of claim 16, wherein the completion queue interface circuit is further to:

determine a submission queue identifier that identifies the corresponding entry of the submission queue for the command; and generate a completion queue message for the completion request that includes the command identifier, the submission queue identifier, and the host tag.

18. The system of claim 13, wherein to trigger the PRI handler, the translation request circuitry is to send a translation miss message to the PRI handler, the translation miss message comprising the virtual address and a command identifier associated with the entry in the completion queue.

19. The system of claim 13, wherein the translation request circuitry is further to:

detect the completion request that is recirculated from the set of completion request queues;

request the address translation circuit to obtain an address translation from the host system corresponding to the virtual address;

receive, from the address translation circuit, the address translation; and generate, using the address translation, a completion queue message that is associated with the completion request and that targets the entry in the completion queue.

20. The system of claim 18, further comprising the PRI handler one of coupled to or included within the completion queue interface circuit, the PRI handler to perform operations comprising:

responsive to receiving the translation miss message, sending the page miss request to the translation agent of the host system, the page miss request including the virtual address and a command identifier associated with the entry in the completion queue; and responsive to receiving the page miss response, sending the restart message to the completion queue interface circuit, the restart message containing a host tag associated with the particular completion queue.

* * * * *